(12) United States Patent
Jiang et al.

(10) Patent No.: US 10,013,795 B2
(45) Date of Patent: Jul. 3, 2018

(54) OPERATION SUPPORT METHOD, OPERATION SUPPORT PROGRAM, AND OPERATION SUPPORT SYSTEM

(71) Applicant: FUJITSU LIMITED, Kawasaki-shi, Kanagawa (JP)

(72) Inventors: Shan Jiang, Zama (JP); Keiju Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/262,688

(22) Filed: Sep. 12, 2016

(65) Prior Publication Data
US 2017/0076491 A1   Mar. 16, 2017

(30) Foreign Application Priority Data

Sep. 14, 2015 (JP) ................................. 2015-180828

(51) Int. Cl.
G06T 19/00 (2011.01)
G06T 15/20 (2011.01)
G06T 15/04 (2011.01)

(52) U.S. Cl.
CPC ............ *G06T 15/205* (2013.01); *G06T 15/04* (2013.01); *G06T 15/20* (2013.01); *G06T 19/00* (2013.01); *G06T 19/003* (2013.01); *G06T 2210/61* (2013.01); *G06T 2215/06* (2013.01)

(58) Field of Classification Search
None
See application file for complete search history.

(56) References Cited

U.S. PATENT DOCUMENTS

2008/0304707 A1  12/2008  Oi et al.
2012/0032955 A1   2/2012  Matsuda

2013/0083063 A1*  4/2013  Geisner .............. G06T 19/006
                                           345/633
2013/0229546 A1*  9/2013  Furumura ........... G06T 3/4038
                                           348/229.1
2015/0049116 A1   2/2015  Suto et al.

FOREIGN PATENT DOCUMENTS

| JP | 2008-124795 A | 5/2008 |
| JP | 2008-304268 A | 12/2008 |
| JP | 2010-257123 A | 11/2010 |
| JP | 2011-159162 A | 8/2011 |
| JP | 2012-156930 A | 8/2012 |

OTHER PUBLICATIONS

Scratchapixel, "3D Viewing: the Pinhole Camera Model," https://www.scratchapixel.com/lessons/3d-basic-rendering/3d-viewing-pinhole-camera/virtual-pinhole-camera-model, Feb. 2015.*
Alem et al., "Remote Tele-assistance System for Maintenance Operators in Mines," University of Wollongong, 2011.*
Heyden et al., "Multiple view geometry." Emerging topics in computer vision (2005).*

* cited by examiner

*Primary Examiner* — Nicholas R Wilson
(74) *Attorney, Agent, or Firm* — Fujitsu Patent Center

(57) ABSTRACT

An operation support method is disclosed. A three dimensional panorama image is generated by overlapping multiple images with each other based on posture information of a camera and a feature point map of the multiple images captured by the camera. The three dimensional panorama image is displayed at a first display device. At a second display device, position information of a target indicated is output based on current posture information of the camera in response to an indication of the target on the three dimensional panorama image.

8 Claims, 17 Drawing Sheets

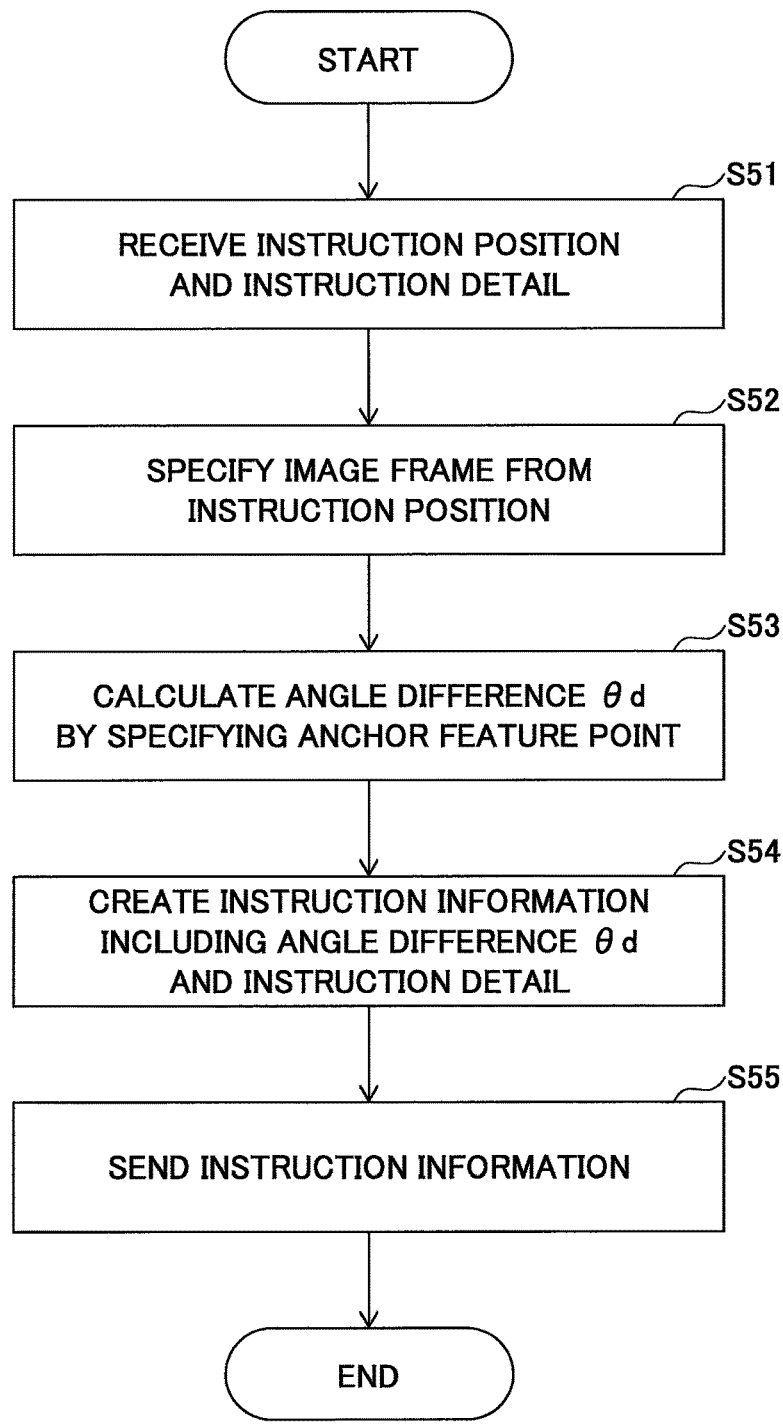

OPERATION SUPPORT METHOD, OPERATION SUPPORT PROGRAM, AND OPERATION SUPPORT SYSTEM

CROSS-REFERENCE TO RELATED APPLICATIONS

This application is based upon and claims the benefit of priority of the prior Japanese Patent Application No. 2015-180828, filed on Sep. 14, 2015, the entire contents of which are incorporated herein by reference.

FIELD

The embodiments discussed herein are related to an operation support method, an operation support program, and an operation support system.

BACKGROUND

In various jobs (such as maintenance, inspection, and the like of a factory or a plant), problems have been raised due to a labor shortage for a fostering of on-site engineers. In order to solve these problems, various technologies are proposed to display a visual annotation representing an instruction sent from a remote instructor at a Head Mounted Display (HMD) mounted on a head of the operator.

PATENT DOCUMENTS

Japanese Laid-open Patent Publication No. 2011-159162
Japanese Laid-open Patent Publication No. 2012-156930
Japanese Laid-open Patent Publication No. 2008-304268
Japanese Laid-open Patent Publication No. 2008-124795
Japanese Laid-open Patent Publication No. 2010-257123

SUMMARY

According to one aspect of the embodiments, an operation support method, including generating a three dimensional panorama image by overlapping multiple images with each other based on posture information of a camera and a feature point map of the multiple images captured by the camera, and displaying the three dimensional panorama image at a first display device; and outputting, at a second display device, position information of a target indicated based on current posture information of the camera in response to an indication of the target on the three dimensional panorama image.

According to other aspects of the embodiment, an operation support apparatus and a computer-readable recording medium may be provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram for explaining an instruction information creation process.

DESCRIPTION OF EMBODIMENTS

In technologies to display a visual annotation representing an instruction sent from a remote instructor at a Head Mounted Display (HMD) of an operator, a visual field of an image sent from an operator has a narrow range. Also, the image may be swayed right and left, and up and down due to a movement of the head of the operator. Accordingly, it is difficult for the instructor who sends the instruction, to capture a full picture of a work site.

Figure 1:
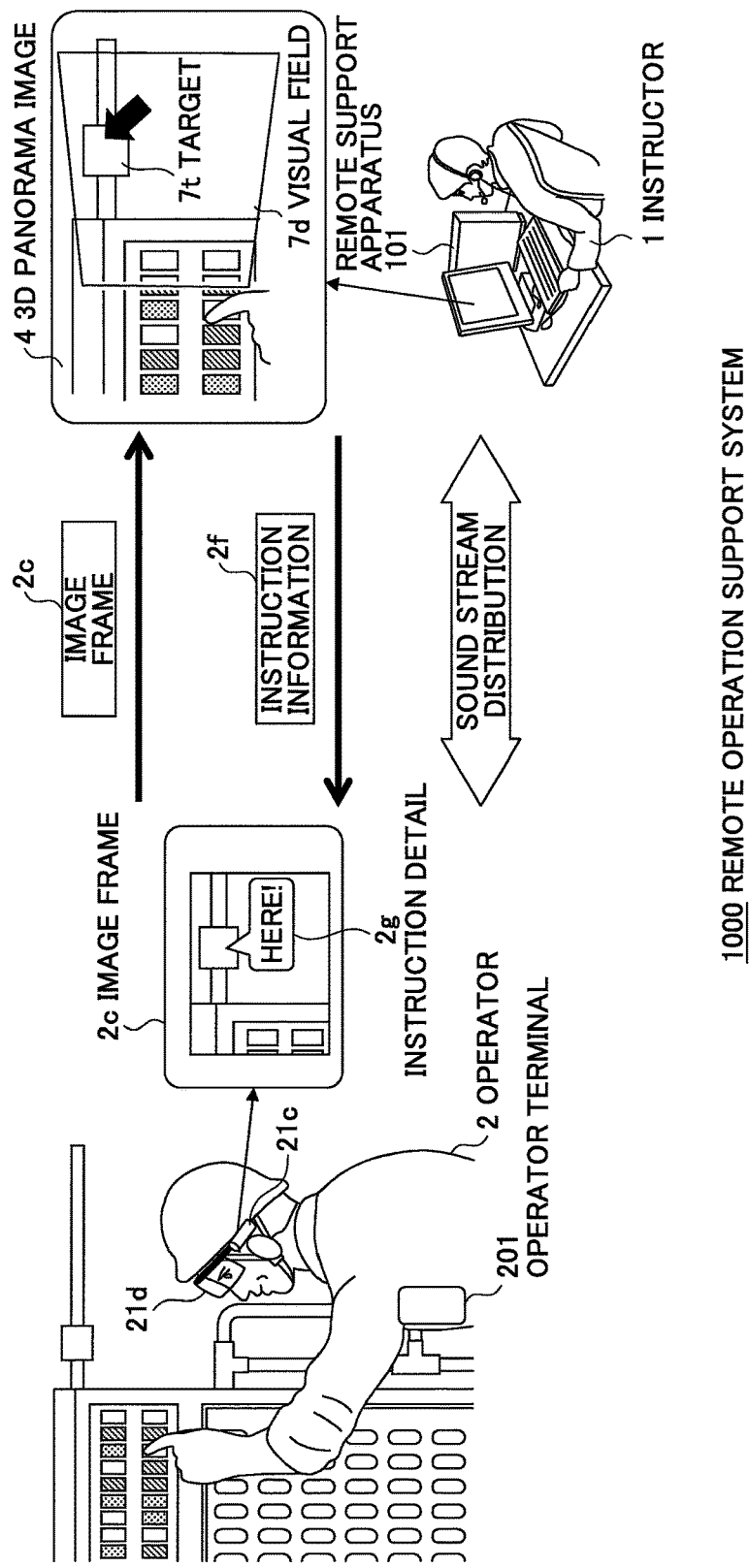
FIG. 1 is a diagram for explaining an example of a remote operation support.

Preferred embodiments of the present invention will be described with reference to the accompanying drawings. FIG. 1 is a diagram for explaining an example of remote operation support. In a remote operation support system 1000 in FIG. 1, a case, in which an operator 2 such as a new worker works in accordance with an instruction from an instructor 1 who is a person of experience for the work site, is depicted.

The operator 2 at the work site possesses an operator terminal 201, and wears a display device 21d and a camera 21c. The operator terminal 201 may be connected to each of the display device 21d and the camera 21c via short distance radio communication such as Bluetooth (registered trademark) or the like.

An image frame 2c, which includes a two dimensional (2D) image captured by the camera 21 of the operator 2, is sent as a site state to the remote support apparatus 101 of the instructor 1 via a radio network communication function of the operator terminal 201.

A voice of the operator 2 may be sent with the image frame 2c. A range depicted by an image of the image frame 2c corresponds to the visual field 7d. In the following, the visual field 7d is described as a range where the image of a latest image frame 2c is depicted.

The remote support apparatus 101 is operated by the instructor 1. The remote support apparatus 101 generates a three dimensional (3D) panorama image 4 from the image frame 2c sent from the operator terminal 201 at a remote area, and displays the generated 3D panorama image 4. The instructor 1 comprehends a state of a remote work site from the 3D panorama image 4 displayed at the remote support apparatus 101. The 3D panorama image 4 is updated by the image frame 2c every time of receiving the image frame 2c.

The instructor 1 may click a location desired to indicate in the 3D panorama image 4. The remote support apparatus 101 sends the instruction information 2f including location information clicked by the instructor 1, an instruction detail 2g, and the like in the image frame 2c, to the operator terminal 201 of the operator 2.

The display device 21d displays the instruction detail 2g by the visual annotation based on the instruction information 2f, which the operator terminal 201 has received.

The operator terminal 201 is regarded as an information processing terminal such as a smart device or the like, and includes various communication functions. The display device 21d may be a device such as the HMD, which is wearable and capable of input and output voice.

The camera 21c may be a device such as a head mounted camera (HMC), which is wearable and a micro camera such as a Charge Coupled Device (CCD).

The display device 21d and the camera 21c are mounted on the head of the operator 2, and are capable of communicating with the operator terminal 201 via the short distance radio communication or the like. The device 21d and the camera 21c may be integrated as a single device. On the other hand, the device 21d is not limited to a device being mounted on the head. The camera 21c is mounted on the head of the operator 2. The display device 21d may be a mobile terminal or the like and may be held at a position available for the operator 2 to view.

At the work site, the image frame 2c, which indicates a work environment that the camera 21c of the operator 2 has captured, is transmitted to the remote support apparatus 101. The image frame 2c is displayed at the remote support apparatus 101.

When the instructor 1 inputs the instruction detail 2g on the image frame 2c displayed at the remote support apparatus 101, the instruction information 2f is sent to the operator terminal 201. When receiving the instruction information 2f, the operator terminal 201 displays the instruction detail 2g at the indicated location specified by the instruction information 2f. In the embodiment, the indicated location is represented by an angle difference θd, which will be described later, in the instruction information 2f.

On the other hand, voice communication is capable between the operator 2 and the instructor 1. A sound stream is distributed between the operator terminal 201 and the remote support apparatus 101.

In the embodiment, instead of the two dimensions, the 3D panorama image 4 is created based on multiple image frames 2c captured by the camera 21c. By creating the 3D panorama image 4, it is possible for the operator 2 to draw the 3D panorama image 4 as a scene of a view direction of the operator 2.

By displaying the 3D panorama image 4 as the scene of the view direction of the operator 2, it is possible for the instructor 1 to intuitively recognize a head position and the view direction of the operator 2. That is, since the instructor 1 may physically sense the scene, which is viewed from the head position of the operator 2, it is possible for the instructor 1 to acquire a realistic feeling of a distance between a target 7t and the operator 2 more precisely.

Also, in a case in which the instructor 1 indicates the target 7t in the 3D panorama image 4, it is possible to precisely specify a position of the target 7t with respect to a current head location and the view direction of the operator 2. Accordingly, it is possible to precisely display the instruction detail 2g at the display device 21d of the operator 2.

Figure 2:
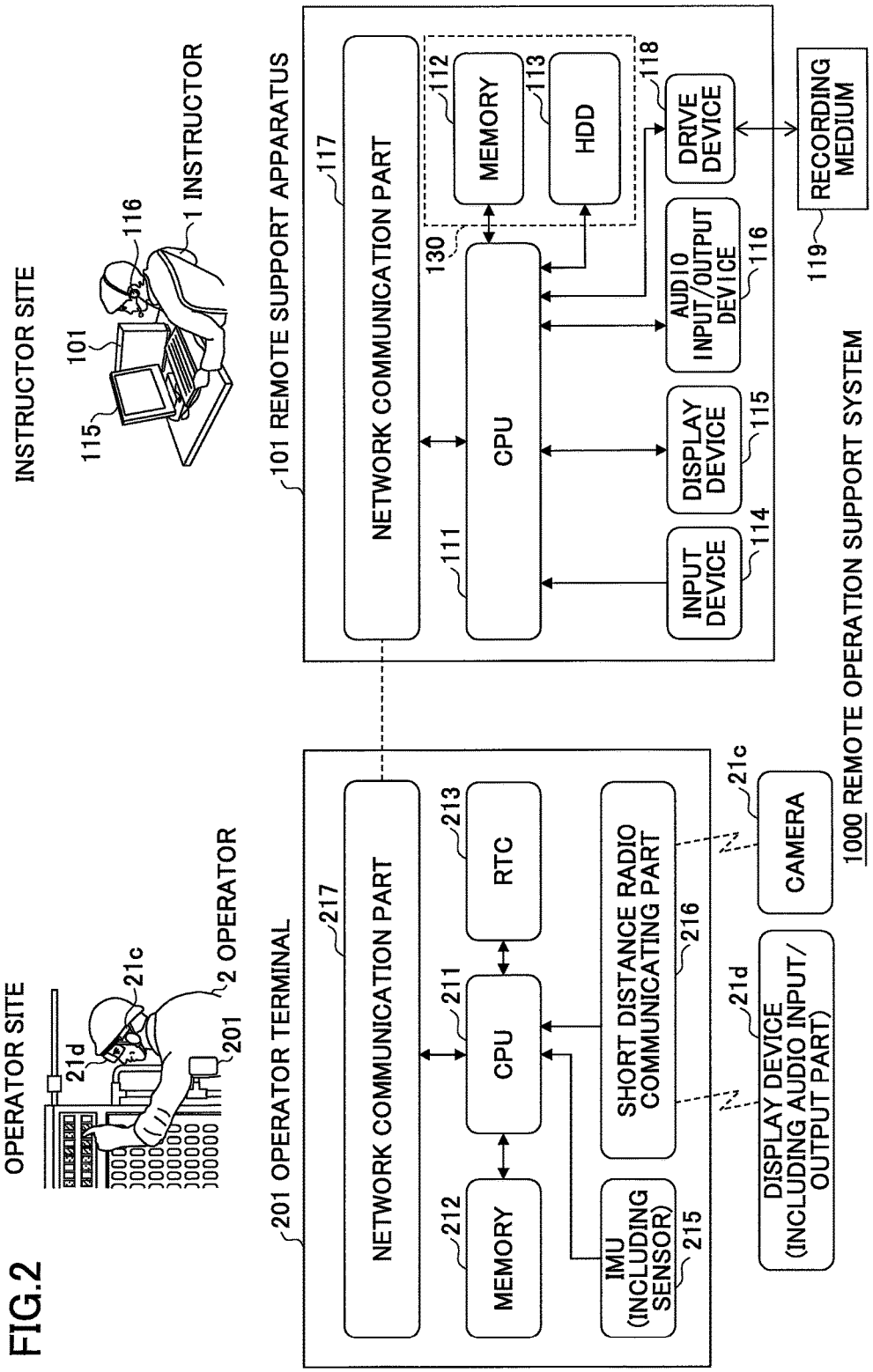
FIG. 2 is a diagram illustrating a hardware configuration of a remote operation support system.

FIG. 2 is a diagram illustrating a hardware configuration of the remote operation support system. In the remote operation support system 1000, the remote support apparatus 101 includes a Central Processing Unit (CPU) 111, a memory 112, a Hard Disk Drive (HDD) 113, an input device 114, a display device 115, an audio input/output device 116, a network communication part 117, and a drive device 118. At least one of the memory 112 and the Hard Disk Drive (HDD) 113 corresponds to a storage device 130.

The CPU 111 corresponds to a processor that controls the remote support apparatus 101 in accordance with a program stored in the memory 112. A Random Access Memory (RAM), a Read Only Memory (ROM), and the like are used as the memory 112. The memory 112 stores or temporarily stores the program executed by the CPU 111, data used in a process of the CPU 111, data acquired in the process of the CPU 111, and the like.

The HDD 113 is used as an auxiliary storage device, and stores programs and data to perform various processes. A part of the program stored in the HDD 113 is loaded into the memory 112, and is executed by the CPU 111. Then, the various processes are realized.

The input device 114 includes a pointing device such as a mouse, a keyboard, and the like, and is used by the instructor 1 to input various information items for the process conducted in the remote support apparatus 101. The display device 115 displays various information items under control of the CPU 111. The input device 114 and the display device 115 may be integrated into one user interface device such as a touch panel or the like.

The audio input/output device 116 includes a microphone for inputting the audio sound such as voice and a speaker for outputting the audio sound. The network communication part 117 performs a wireless or wired communication via a network. Communications by the network communication part 117 are not limited to wireless or wired communications.

The program for realizing the process performed by the remote support apparatus 101 may be provided by a recording medium 119 such as a Compact Disc Read-Only Memory (CD-ROM).

The drive device 118 interfaces between the recording medium 119 (the CD-ROM or the like) set into the drive device 118 and the remote support apparatus 101.

Also, the recording medium 119 stores the program which realizes various processes according to the first embodiment which will be described later. The program stored in the recording medium 119 is installed into the remote support apparatus 101. The installed program becomes executable by the remote support apparatus 101.

It is noted that the recording medium 119 for storing the program is not limited to the CD-ROM. The recording medium 119 may be formed of a non-transitory or tangible computer-readable recording medium including a structure. In addition to the CD-ROM, a portable recording medium such as a Digital Versatile Disk (DVD), a Universal Serial Bus (USB) memory, a semiconductor memory such as a flash memory, or the like may be used as the computer-readable recording medium 119.

The operator 2 puts the operator terminal 201, the display device 21d, and the camera 21c on himself. The operator terminal 201 includes a CPU 211, a memory 212, a Real Time Clock (RTC) 213, an Inertial Measurement Unit (IMU) 215, a short distance radio communicating part 216, and a network communication part 217.

The CPU 211 corresponds to a processor that controls the operator terminal 201 in accordance with a program stored in the memory 212. A Random Access Memory (RAM), a Read Only Memory (ROM), and the like are used as the memory 212. The memory 212 stores or temporarily stores the program executed by the CPU 211, data used in a process of the CPU 211, data acquired in the process of the CPU 211, and the like. The program stored in the memory 212 is executed by the CPU 211 and various processes are realized.

The RTC 213 is a device that measures a current time. The IMU 215 includes an inertial sensor, and also, corresponds to a device that includes an acceleration measuring function and a gyro function. The IMU 215 outputs information pertinent to movement of the operator 2.

The short distance radio communicating part 216 conducts short distance radio communications with each of the display device 21d and the camera 21c. The short distance communication may be Bluetooth (registered trademark) or the like. The network communication part 217 sends the image frame 2c, to which posture information is attached, to the remote support apparatus 101, and receives instruction information 2f.

The display device 21d includes a short distance radio communication function, and an audio input/output section. The display device 21d may be a wearable-type display device being eye glasses mounted towards the visual line direction on the head. The display device 21d includes a transparent display part. It is preferable for the operator 2 to visually observe a real view in the visual line direction. The display device 21d displays the instruction detail 2g included in the instruction information 2f received from the operator terminal 201 by the short distance wireless communication.

The camera 21c includes the short distance wireless communication function. The camera 21c is mounted on the head of the operator 2, captures a video in the visual line direction of the operator 2, and sends the image frames 2c to the operator terminal 201 by the short distance wireless communication.

In the operator terminal 201, a monocular Simultaneous Localization And Mapping (SLAM) function is realized by the CPU 211 executing a corresponding program. By the monocular SLAM function, information of the position and the posture of the camera 21 (hereinafter, called "position-and-posture information 3c" (FIG. 3)) and a feature point map 3m (FIG. 3) indicating three dimensional positions of feature points in the image are simultaneously estimated from the image captured by the camera 21. The feature point map 3m corresponds to a three dimensional (3D) feature point map, and represents a three dimensional real environment.

By acquiring the position-and-posture information 3c and the feature point map 3m, it is possible to generate an environment map representing a real environment in the three dimensions. A self-position estimation is conducted by the monocular SLAM function based on world coordinate systems.

Figure 3:
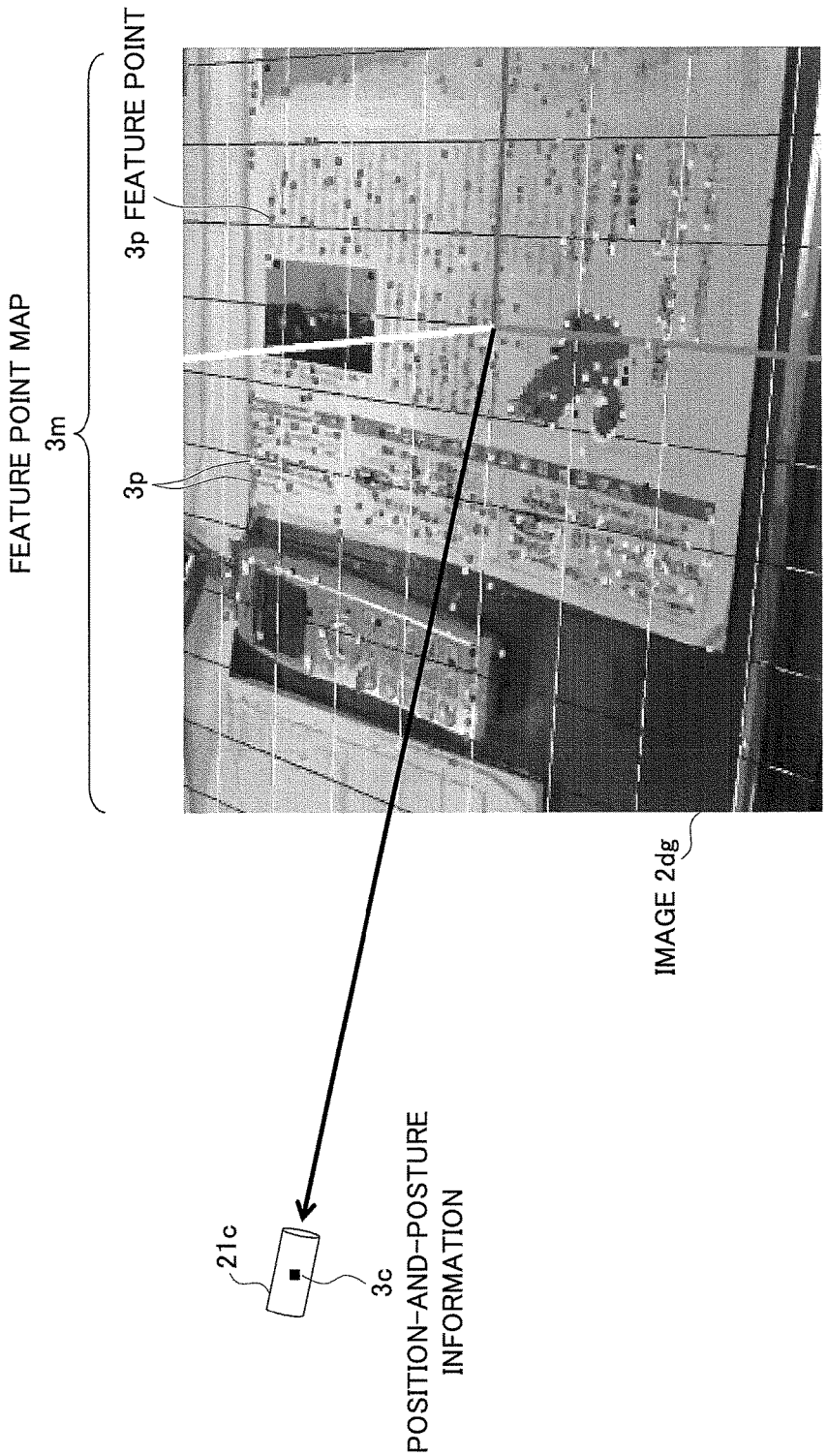
FIG. 3 is a diagram illustrating an example of information included in an image frame.

FIG. 3 is a diagram illustrating an example of information included in the image frame. In FIG. 3, the camera 21c captures an image 2dg. The image 2dg is a two dimensional image, and is analyzed by the monocular SLAM function to extract multiple feature points 3p. The feature map 3m formed by the multiple feature points 3p is acquired. Each of the feature points 3p is indicated by three dimensional coordinates. Also, the position-and-posture information 3c of the camera 21c is acquired from a coordinate system in the image 2dg.

The image 2dg, the feature point map 3m, the position-and-posture information 3c, and the like are included in the image frame 2c, and are sent to the remote support apparatus 101.

Next, an internal parameter of the camera 21c (may be called "camera parameter") and a frustum generation model, which are retained in the remote support apparatus 101, will be described.

Figure 4:
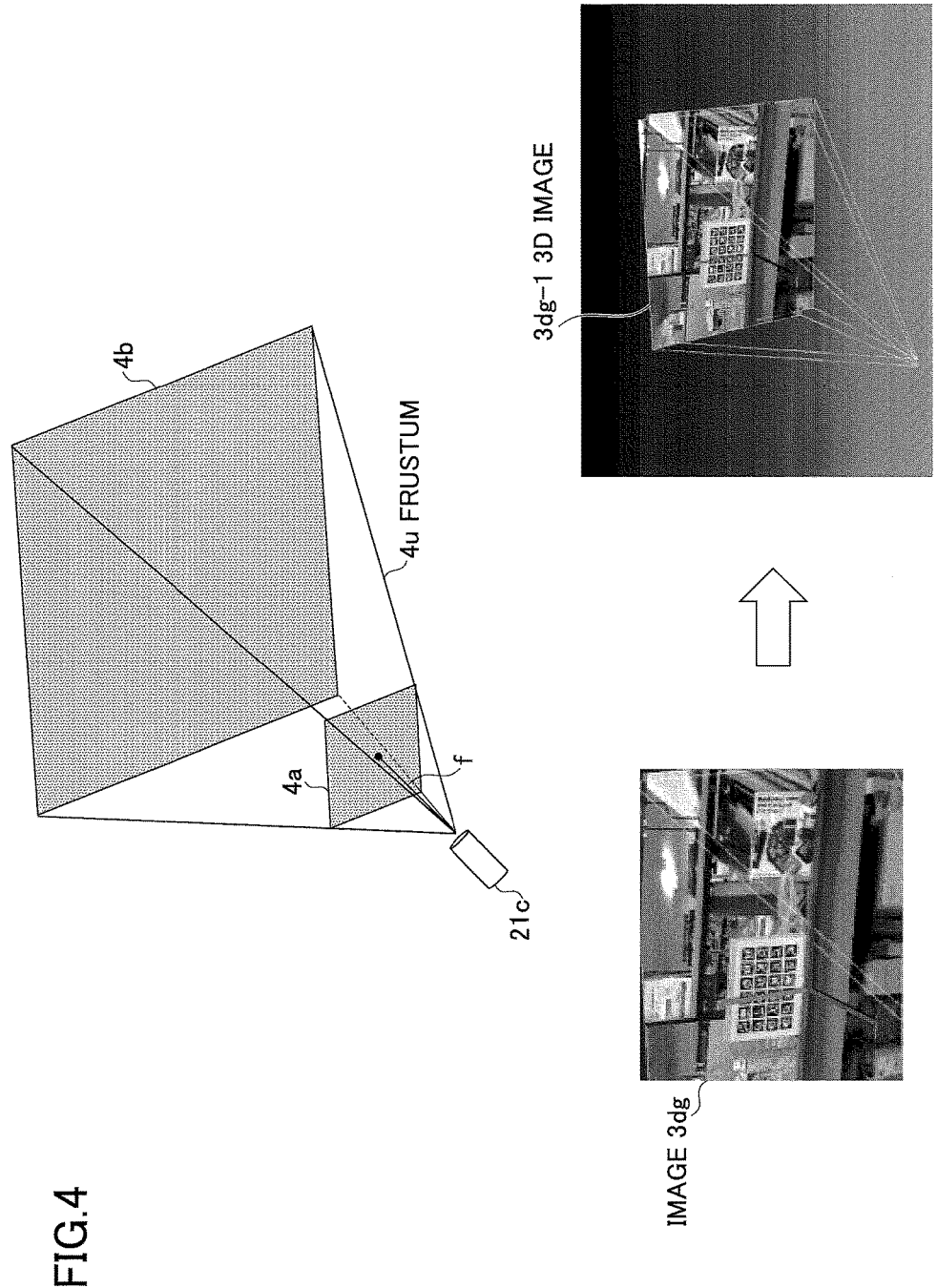
FIG. 4 is a diagram for explaining a creation of an image drawing object based on a camera parameter.

FIG. 4 is a diagram for explaining a creation of an image drawing object based on the camera parameter. Referring to FIG. 4, a camera parameter K and the frustum generation model are described.

A frustum 4u of the camera 21c is given to the remote support apparatus 101 beforehand. The frustum 4u is defined by a front surface 4a and a rear surface 4b, which are acquired based on a focal length of the camera 21c. The front surface 4a corresponds to a screen of the camera 21c.

Also, by defining a distance to the rear surface 4b beforehand, a range of the rear surface 4b, which depends on the distance given with respect to the front surface 4a, is acquired. On the rear surface 4b, a 3D image 3dg-1 is drawn in a three dimensional Computer Graphics (CG) space.

The camera parameter K is a matrix expressed by the following formula 1.

$$K = \begin{bmatrix} f & s & c_x \\ 0 & af & c_y \\ 0 & 0 & 1 \end{bmatrix}$$ [Formula 1]

In the formula 1, f indicates the focal length, s indicates a skew, a indicates an aspect ratio, and $c_x$ and $c_y$ specify an optical center. The camera parameter K is generally estimated by using a calibration chart. Alternatively, the skew s=0 and the aspect ratio a=1 may be defined, and the $c_x$ and $c_y$ may indicate an image center.

The frustum 4u may be generated by the frustum generation model of the following formula 2 and formula 3.

$$\text{aspect}_{ratio} = \frac{fy}{fx}$$ [Formula 2]

By the formula 2, the aspect ratio ($\text{aspect}_{ratio}$) is calculated based on the focal length f of the camera 21c.

$$fovy=2*a\tan 2(cy,fy)*180/pi$$

By the formula 3, a field angle fovy is calculated by using the optical center of the camera 21c specified by $c_x$ and $c_y$, and the focal length f.

The frustum 4u for the three dimensional graphics of the camera 21 is generated by using the acquired aspect ratio ($\text{aspect}_{ratio}$) and the acquired field angle fovy. The image 2dg is converted into the 3D image 3dg-1 by conducting a texture mapping of the two dimensional image based on the generated frustum 4u. The 3D image 3dg-1 is deployed and drawn at a position and in a direction based on the position-and-posture information 3c.

Figure 5:
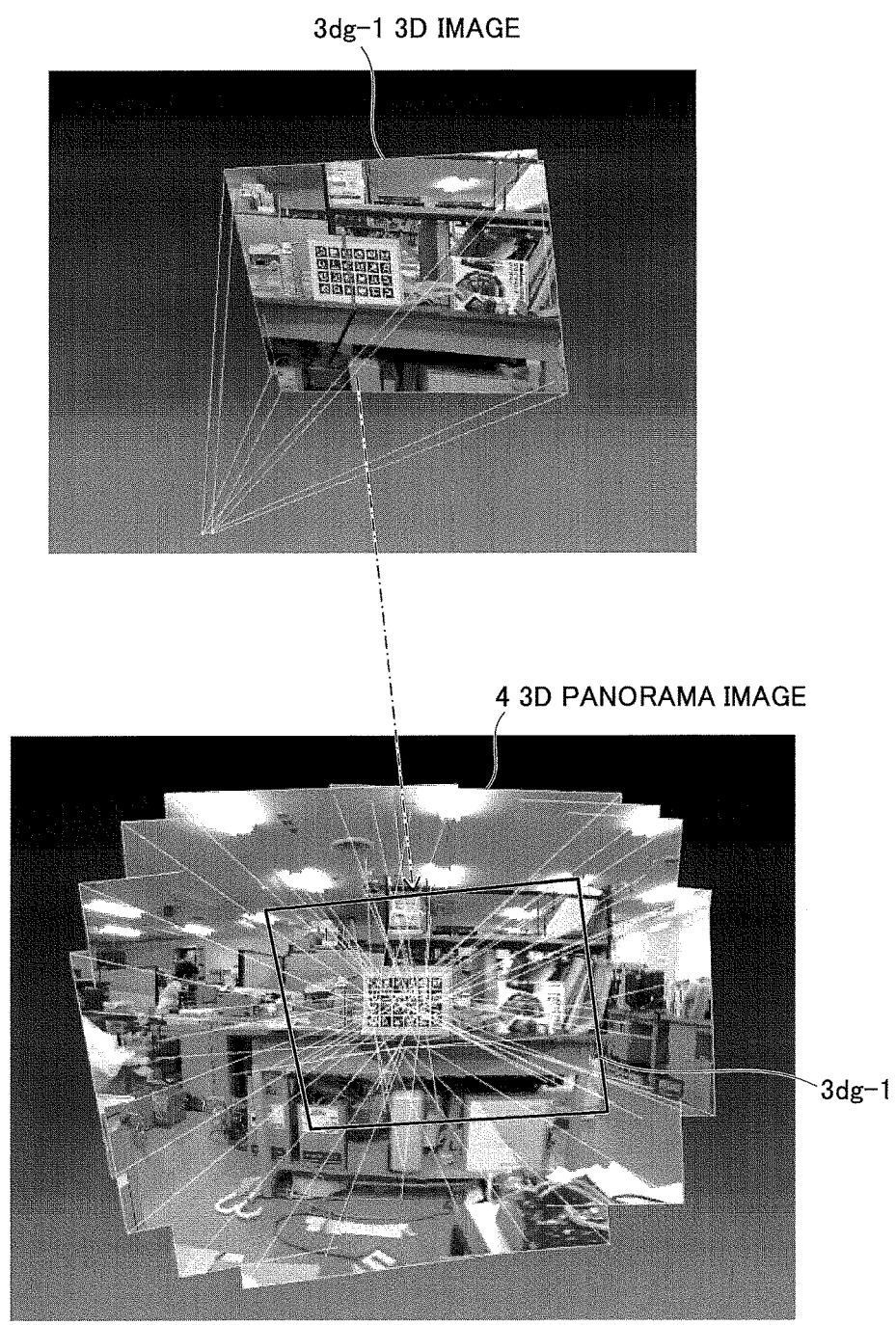
FIG. 5 is a diagram for explaining a generation method of a 3D panorama image.

FIG. 5 is a diagram for explaining a generation method of the 3D panorama image. In FIG. 5, the remote support apparatus 101 generates the 3D panorama image 4 by connecting the 3D images 3*dg*-1 to each other at the multiple feature points 3*p* based on the position-and-posture information 3*c* and the multiple feature points 3*p* in the three dimensional space. The multiple feature points 3*p* in the three dimensional space are extracted from the multiple image frames 2*c* successively received from the operator terminal 201.

When the 3D panorama image 4 is generated, each of the 3D images 3*dg*-1 may be set as key frames. The 3D images 3*dg*-1 successively received are sampled at predetermined intervals and sampled as the key frames.

Figure 6:
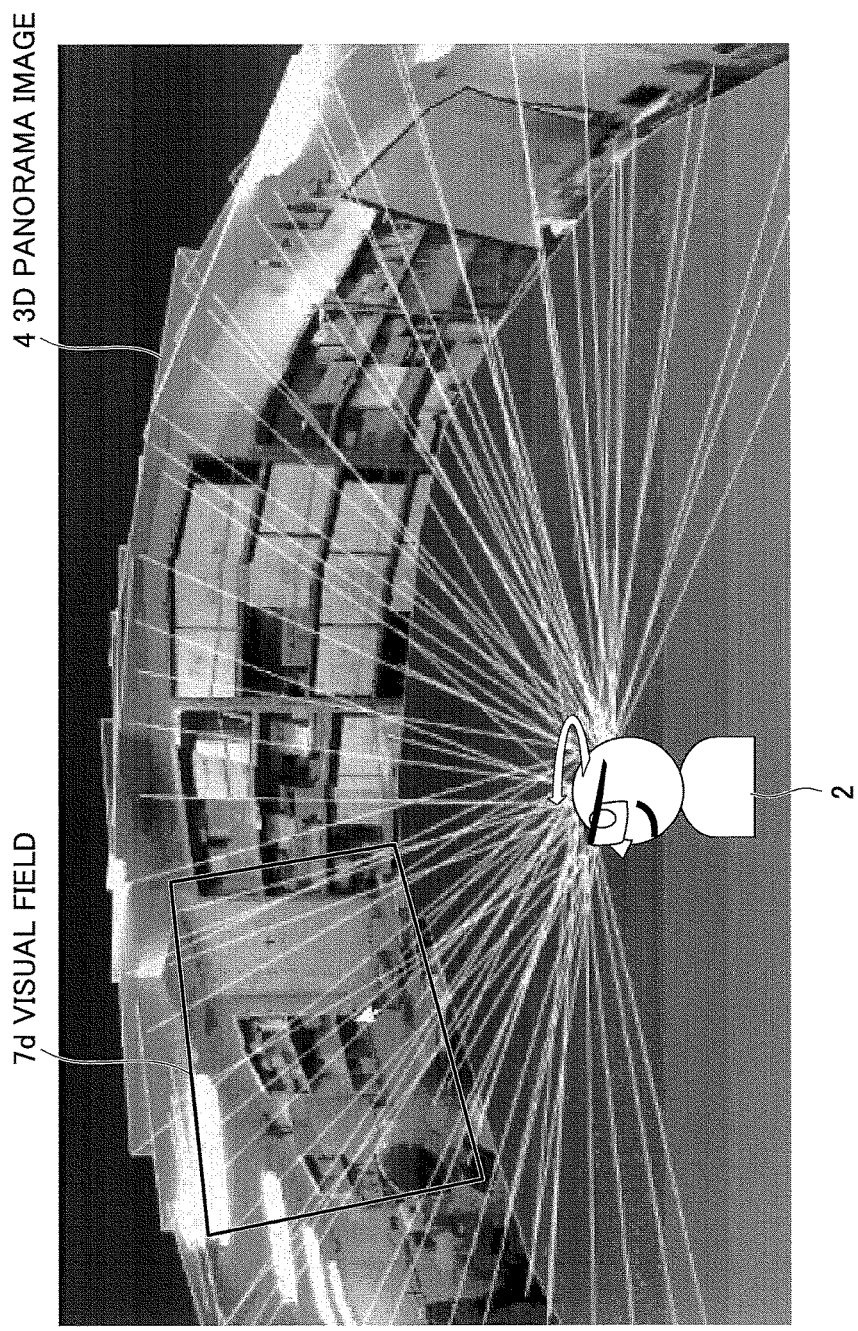
FIG. 6 is a diagram illustrating a display example of the 3D panorama image at a work site depending on a horizontal rotation of a head of an operator from right to left.

FIG. 6 is a diagram illustrating a display example of the 3D panorama image at the work site depending on a horizontal rotation of the head of the operator from right to left. When the operator 2 moves the head from right to left at the work site, the 3D panorama image 4 is displayed at the remote support apparatus 101 as illustrated in FIG. 6.

In FIG. 6, the operator 2 is depicted for convenience. The 3D panorama image 4 supplies perspective to the instructor 1. Hence, it is possible for the instructor 1 to confirm the work environment with the sense of distance as if the instructor 1 views around him or her at the location of the operator 2.

When the focal length f of the camera 21*c* is fixed, the 3D panorama image 4 is projected onto an approximate column.

In the embodiment, the operator 1 operates the input device 114 and points to the target 7*t* on the 3D panorama image 4 displayed at the display device 115 of the remote support apparatus 101. The instruction detail 2*g* is displayed at a precise position with respect to the target 7*t* at the display device 21*d*. A method for acquiring a display position of the instruction detail 2*g* will be described for a case in which the target 7*t* is inside the visual field 7*d* and a case in which the target 7*t* is outside the visual field 7*d*.

Figure 7A:
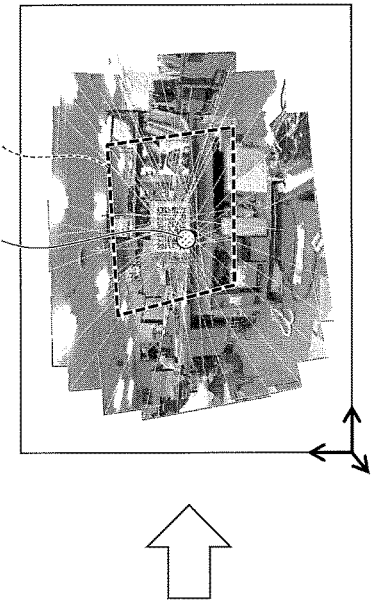
FIG. 7A through FIG. 7D are diagrams for explaining a case in which a target is indicated within a visual field on the 3D panorama image.

FIG. 7A through FIG. 7D are diagrams for explaining a case in which the target is indicated within the visual field on the 3D panorama image. FIG. 7A depicts a state in which the instructor 1 indicates, by the input device 114, a target 7*t*-2 at an instruction position 7*p*-2 in the 3D panorama image 4 being displayed at the display device 115 of the remote support apparatus 101. In this example, the target 7*t*-2 exists in a current visual field 7*d*-2 of the operator 2.

Figure 7B:
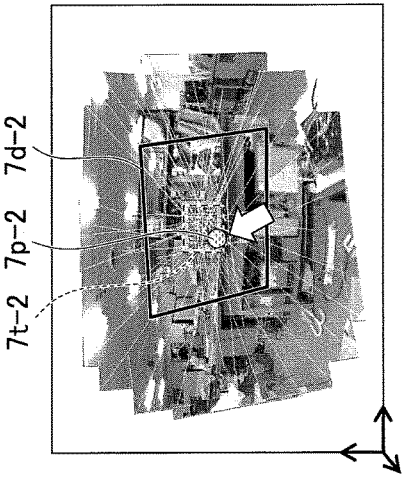

In response to the indication of the target 7*t*-2, the target 7*t*-2 is specified by applying a collision determination of 3D graphics, and a key frame 7*kf*-2 (a 3D image 3*dg*-2) including the target 7*t*-2 is acquired. FIG. 7B illustrates an example of the key frame 7*kf*-2 (the 3D image 3*dg*-2) including the feature points 3*p* of the target 7*t*-2. In this example, since the target 7*t*-2 is inside the visual field 7*d*-2, the latest key frame 7*kf*-2 corresponding to the visual field 7*d*-2 is selected.

Figure 7C:
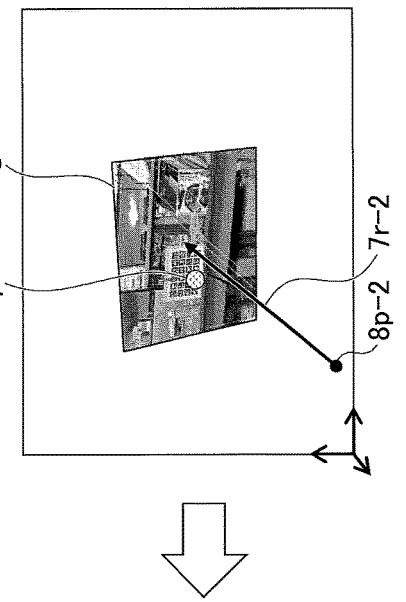
Figure 7D:
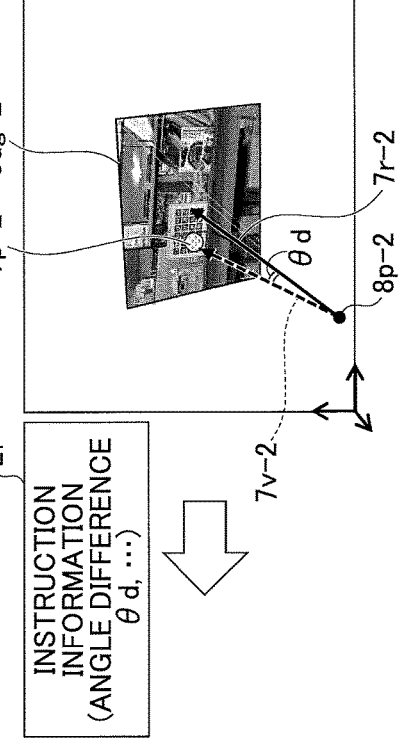

With reference to FIG. 7C and FIG. 7D, an acquisition of the instruction information 2*f* will be described by using the 3D image 3*dg*-2 acquired from the key frame 7*kf*-2. First, a vector representing the view direction toward the 3D image 3*dg*-2 is set as a reference vector 7*r*-2 (FIG. 7C) based on a position 8*p*-2 of the camera 21*c* in the three dimensional space.

Accordingly, the angle difference θd a target vector 7*v*-2 from the position 7*p*-2 of the camera 21*c* to the instruction position 7*p*-2 is calculated. The angle difference θd indicates a rotation amount of the head of the operator 2.

FIG. 7D indicates the angle difference θd in a case in which the instruction position 7*p*-2 exists in the visual field 7*d*-2 (the 3D image 3*dg*-2). This angle difference θd is included in the instruction information 2*f* and is sent to the operator terminal 201.

Figure 8B:
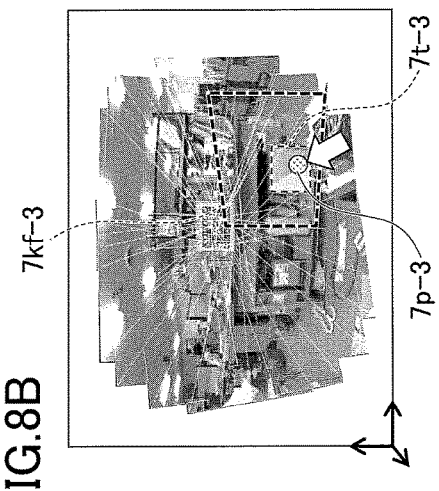
FIG. 8A through FIG. 8D are diagrams for explaining a case in which the target is indicated outside a visual field on the 3D panorama image.
Figure 8A:
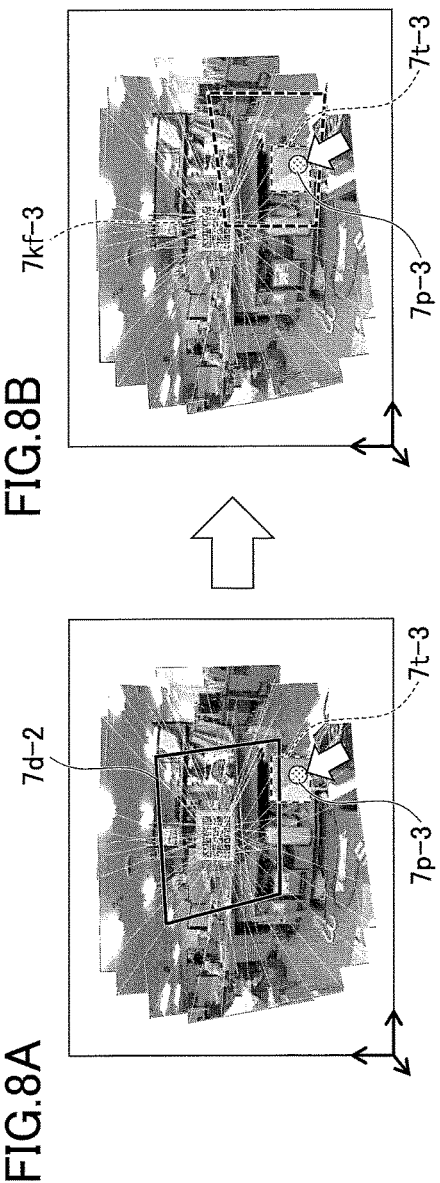

FIG. 8A through FIG. 8D are diagrams for explaining a case in which the target is indicated outside the visual field on the 3D panorama image. FIG. 8A depicts a case in which the position of the head of the operator 2 is retained but a direction of the head is changed.

FIG. 8A illustrates a state in which the instructor 1 indicates, by the input device 114, a target 7*t*-3 in the 3D panorama image 4 displayed at the display device 115 of the remote support apparatus 101. In this example, the target 7*t*-3 exists outside the current visual field 7*d*-2 of the operator 2.

In response to an indication to the target 7*t*-3, the target 7*t*-3 is specified by the collision determination of the 3D graphics, and a key frame 7*kf*-3 (a 3D image 3*dg*-3) including the target 7*t*-3 is acquired. In FIG. 8B, an example of the key frame 7*kf*-3 including the feature points 3*p* of the target 7*t*-3 is depicted. In this example, the key frame 7*kf*-3 (the 3D image 3*dg*-3) is selected differently from a key frame corresponding to the visual field 7*d*-2.

Figure 8C:
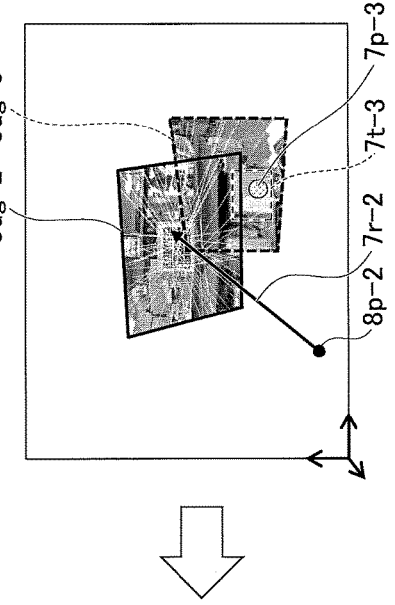
Figure 8D:
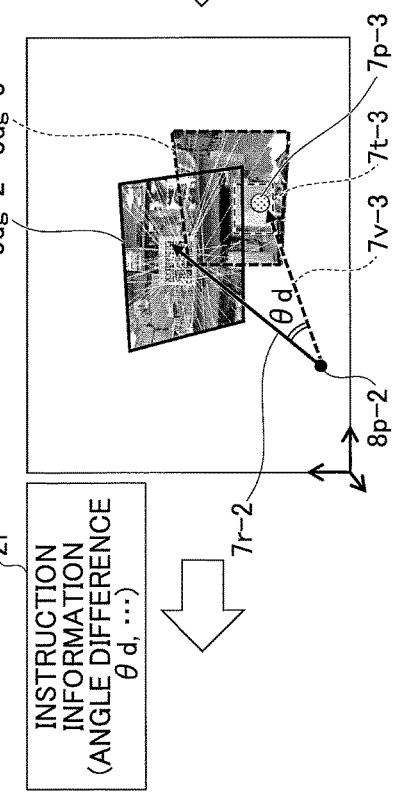

With reference to FIG. 8C and FIG. 8D, the acquisition of the instruction information 2*f* will be described by using the 3D image 3*dg*-2 corresponding to the visual field 7*d*-2 and the 3D image 3*dg*-3 acquired from the key frame 7*kf*-3. First, a vector representing the view direction toward the 3D image 3*dg*-2 is set as the reference vector 7*r*-2 (FIG. 8C) based on the position 8*p*-2 of the camera 21*c* in the three dimensional space.

Then, the angle difference θd between a vector 7*v*-3 from the position 8*p*-2 of the camera 21*c* to an instruction position 7*p*-3 and the vector 7*r*-2 is calculated.

FIG. 8D illustrates the angle difference θd in a case in which the indication position 7*p*-3 is outside the visual field 7*d*-2 (the 3D image 3*dg*-2). The angle difference θd is included in the instruction information 2*f* and is sent to the operator terminal 201. The angle difference θd will be described. In following, the instruction position 7*p*-2, 7*p*-3, and the like are simply called "instruction positions 7*p*".

Figure 9:
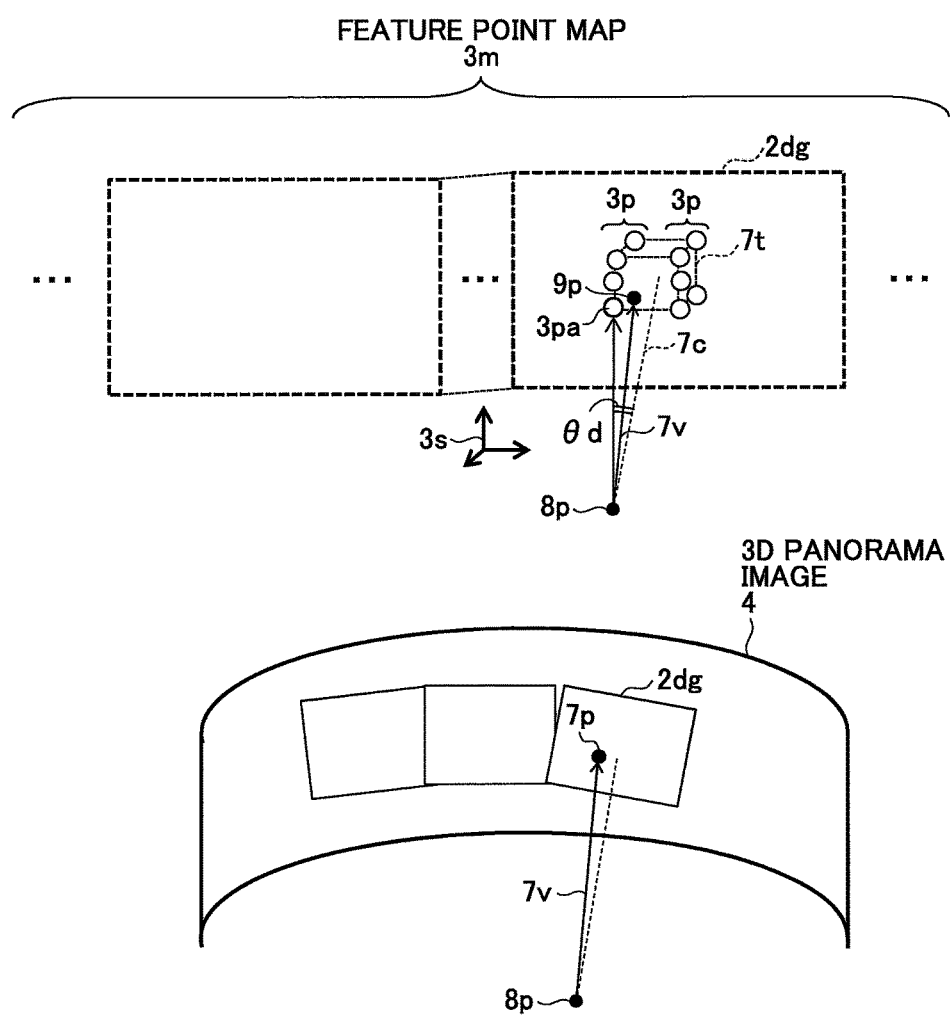
FIG. 9 is a diagram for explaining an angle difference θd.

FIG. 9 is a diagram for explaining the angle difference θd. In FIG. 9, multiple feature point maps 3*m* acquired from respective images 2*dg* are integrated into one feature point map 3*m*.

The remote support apparatus 101 calculates a target vector 7*v* by using a position 8*p* of the camera 21*c* (the head of the operator 2) acquired from the position-and-posture information 3*c*. By the calculated target vector 7*v*, a view point 9*p* is acquired in a direction of the target vector 7*v*. in a map coordinate system 3*s* of the feature point map 3*m*, coordinates of the view point 9*p* corresponding to an instruction position 7*p* of the 3D panorama image 4 at the remote support apparatus 101 is acquired.

In the map coordinate system 3*s* of the feature point map 3*m*, angle information of the target vector 7*v* is snatched with angle information of the vectors of respective feature points 3*p* based on the position 8*p*. In multiple feature points 3*p* having similar angle information with respect to the target vector 7*v*, one feature point 3*p*, which has a shortest distance from the view point 9*p* in a direction of the target vector 7*v* is defined as an anchor feature point 3*pa*.

The remote support apparatus 101 determines an angle as the angle difference θd between a line connecting the anchor feature point 3*pa* with the position 8*p* and the vector 7*c* toward center coordinates of the image 2*dg* from the position 8*p*. The instruction position 7*p* matches with the anchor feature point 3*pa*. The angle difference θd is represented by an angle difference between the vector 7*v* and the vector 7*c*.

Since the angle difference θd is sent to the operator terminal 201, it is possible for the operator terminal 201 to relatively easily specify the target 7*t* based on coordinates of the feature point 3*p* and a direction vector. After the target 7*t* is specified, in association with the position and the posture of the head of the operator 2, the position of the instruction detail 2*g* in a screen coordinate system 21*s* (FIGS. 10A to 10C) in order to display at the display device 21*d*. That is, in a case in which the position of the target 7*t* is changed in the visual field 7*d*, the position of the instruction detail 2*g* is adjusted.

Next, a position adjustment of the instruction detail 2*g* depending on a movement of the operator 2 at the operator terminal 201 will be described.

Figure 10A:
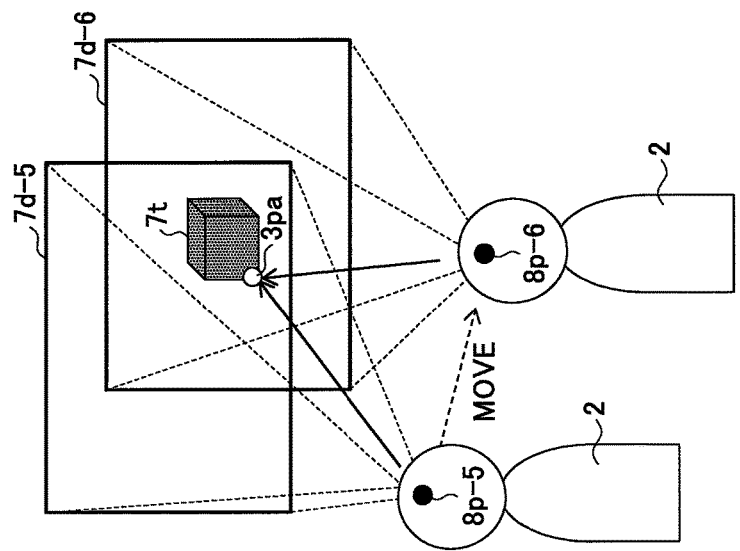
FIG. 10A through FIG. 10C are diagrams for explaining display examples of an instruction detail following a movement of an operation.
Figure 10B:
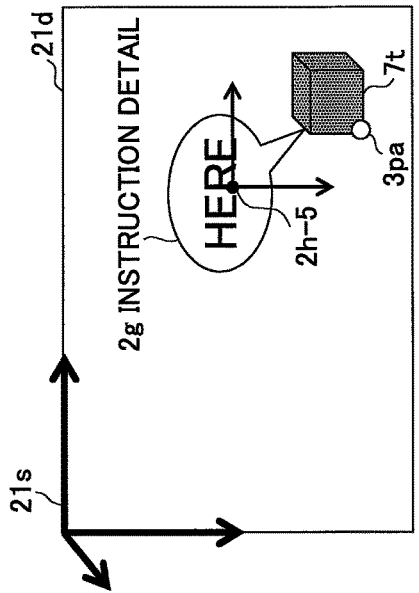
Figure 10C:
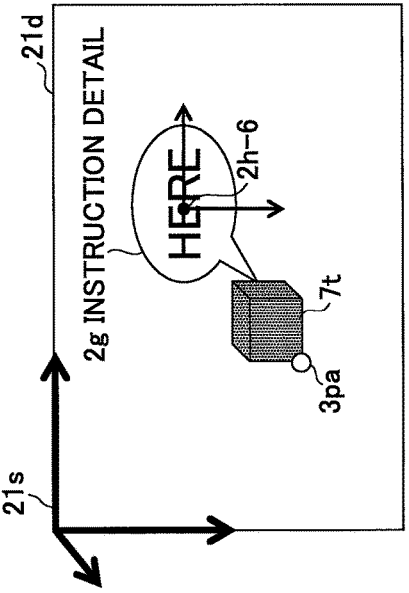

FIG. 10A through FIG. 10C are diagrams for explaining display examples of the instruction detail following the movement of the operator 2. FIG. 10A illustrates an example in which the operator 2 moves from a location 8*p*-5 to a location 8*p*-6. In the visual field 7*d*-5 of the operator 2 at the location 8*p*-5, the target 7*t* is located at a lower right.

When the target 7*t* is indicated by the instructor 1 in the visual field 7*d*-5, as described above, the operator terminal 201 specifies the anchor feature point 3*pa*, and recognizes the target 7*t* by multiple feature points 3*p* including the anchor feature point 3*pa*.

The operator terminal 201 conducts a coordinate conversion from the map coordinate system 3*s* to the screen coordinate system 21*s*, and calculates a display position 2*h*-5 to display the instruction detail 2*g*. In this example, each of distances from the target 7*t* to obstacles (edges of the visual field 7*d*-5) around the target 7*t* is compared with a size of the instruction detail 2*g*, and the display position 2*h*-5 is specified from excess areas around the target 7*t* based on a comparison result. As described in FIG. 10B, the instruction detail 2*g* is displayed at upper left of the target 7*t*.

FIG. 10C illustrates a display example of the instruction detail 2*g* in a visual field 7*d*-6 (FIG. 10A) after the operator 2 moves. In this case, the target 7*t* is positioned to a left side closer a center in the visual field 7*d*-6. It is determined that the excess area to display the instruction detail 2*g* exists at a right side with respect to the target 7*t*, and the instruction detail 2*g* is displayed at a position 2*h*-6.

As described, the operator terminal 201 specifies the target 7*t* by determining the anchor feature point 3*pa* when receiving the instruction information 2*f*. Hence, it is possible to update the position of the instruction detail 2*g* depending on a change of the location of the head of the operator 2.

The map coordinate system 3*s* of the feature map 3*m* represents a coordinate system of a real environment (that is, a coordinate system in a three dimensional real space). A distance from the location of the operator 2, who is tracked by the monocular SLAM function of the operator terminal 201, to the anchor feature point 3*pa* is displayed as illustrated in FIG. 11.

Figure 11:
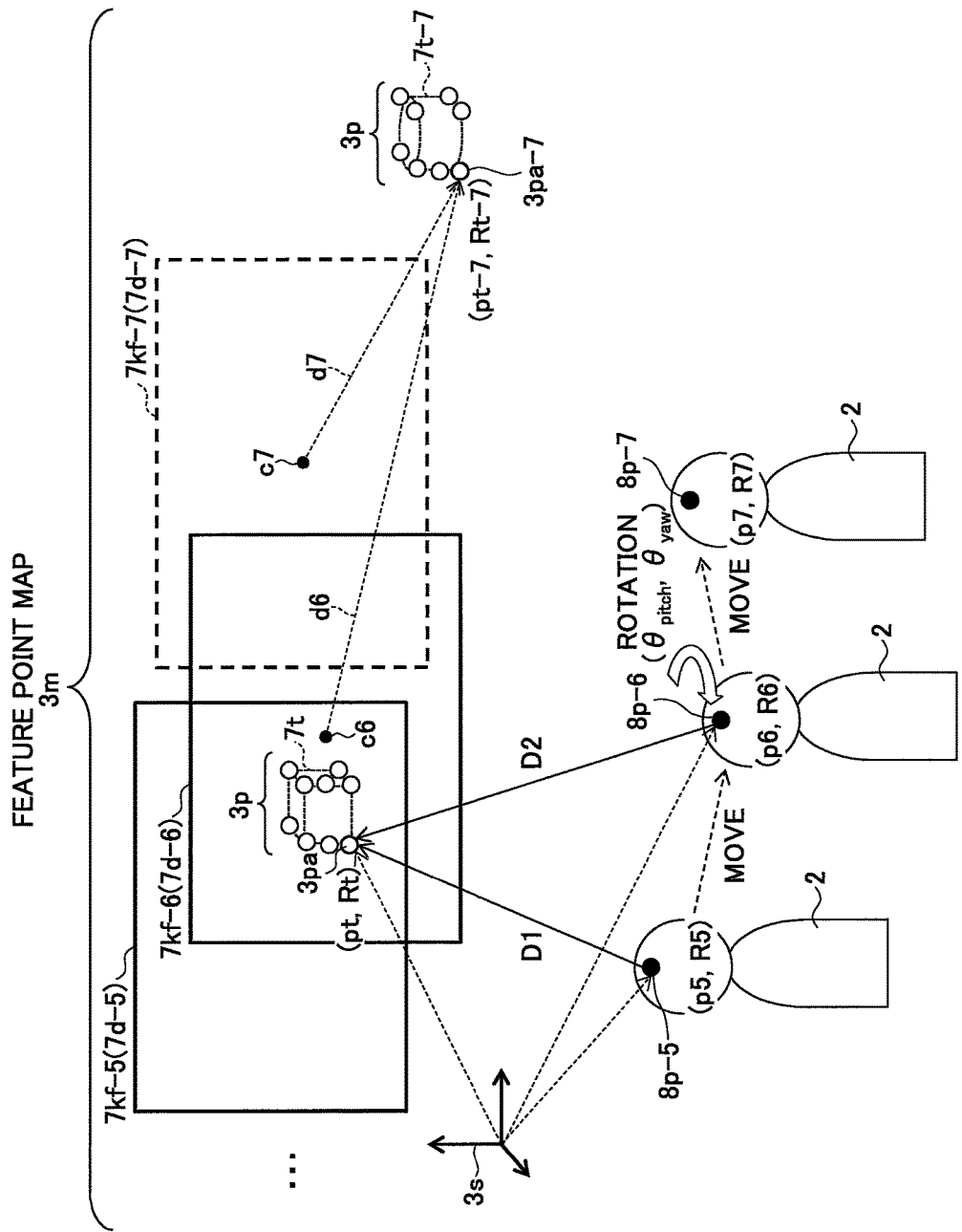
FIG. 11 is a diagram illustrating an acquisition example of a distance in a map coordinate system.

FIG. 11 is a diagram illustrating an acquisition example of the distance in the map coordinate system. In FIG. 11, the movement example of the operator 2 in FIG. 10A is referred to. The map coordinate system 3*s* of the feature point map 3 is defined as the world coordinate system. Locations 8*p*-5 and 8*p*-6, which are tracked by the monocular SLAM function, are indicated by (p5, R5) and (p6, R6) in the map coordinate system 3*s*, respectively.

A frame acquired at the location 8*p*-5 is a key frame 7*kf*-5, and a frame acquired at the location 8*p*-6 is a key frame 7*kf*-6. Coordinates (pt, Rt) of the anchor feature point 3*pa* is specified by using the key frame 7*kf*-5 for the location 8*p*-5. In the key frame 7*kf*-6 at the location 8*p*-6 after the operator 2 moves, the coordinates of the anchor feature point 3*pa* does not change in the map coordinates 3*s*, and are the same coordinates (pt, Rt).

Accordingly, regarding the frame 7*kf*-6 after the operator 2 moves, it is possible to specify the coordinates of the anchor feature point 3*pa* in the visual field 7*d*-6 of the display device 21*d* by using a movement amount from the location 8*p*-5 to the location 8*p*-6 and the screen coordinate system 21*s*.

Also, distances D1 and D2 from respective locations 8*p*-5 and 8*p*-6 to the anchor feature point 3*pa* may be obtained in the map coordinate system 3*s*.

A case in which the target 7*t* is in either one of the visual field 7*d*-5 and the visual field 7*d*-6 are described above. Next, another case, in which a target 7*t*-7 located outside the current visual field 7*d*-6 is indicated, will be described.

As described in FIG. 9, coordinates (p6, R6) of the location 8*p*-6 are acquired based on the position-and-posture information 3*c*. In the multiple feature points 3*p*, which have the angle differences nearest the angle difference θd of the vector from the location 8*p*-6 to an indication position, one feature point 3*p* having a shortest distance to the indication position is determined as the anchor feature point 3*pa*-7. The coordinates (pt-7, Rt-7) is acquired for the anchor feature point 3*pa*-7.

When the anchor feature point 3*pa*-7 is located outside the visual field 7*d*-6, a distance d6 is calculated between a center point c6 in the visual field 7*d*-6 and the anchor feature point 3*pa*-7. A guidance display 9*a*-6 (FIG. 12), which guides toward the target 7*t*-7 located outside the visual field 7*d*-6, is conducted depending on the distance d6.

The operator 2 is guided by the guidance display 9*a*-6 and rotates the head by an angle (θ pitch, θ yaw), or moves to a location 8*p*-7 of coordinates (p7, R7) of the location 8*p*-7. Due to a rotation or a movement, a new key frame 7*kf*-7 is generated. The key frame 7*kf*-7 corresponds to the visual field 7*d*-7. A distance d7 is calculated from a center point c7 of the visual field 7*d*-7 to the anchor feature point 3*pa*-7. A guidance display 9*a*-7 (FIG. 12A and FIG. 12B) is conducted depending on the distance d7.

FIG. 12A and FIG. 12B are diagrams illustrating examples of the guidance display. FIG. 12A illustrates an example of the guidance display in a case of the distance d6 to the target 7*t*-7. In FIG. 12A, the guidance display 9*a*-6 by a guidance icon 9*i* is performed at a lower right area closer to the target 7*t*-7 in the visual field 7*d*-6, so that the guidance icon 9*i* for guiding the operator 2 to the target 7*t*-7 moves on a track 7*q*-6 at speed depending on a distance to the target 7*t*-7.

The area closer the target 7*t*-7 represents a direction to the target 7*t*-7. A vibration presented by a fast movement indicates a longer distance to the target 7*t*-7. The operator 2 sensibly comprehends the direction to the target 7*t*-7 and the distance to the target 7*t*-7.

The operator 2 rotates the head to a direction of the target 7*t*-7, or starts to move. While the operator 2 is moving, the guidance display 9*a*-7 is conducted as illustrated in FIG. 12B. The guidance display 9*a*-7 is displayed at the display device 21*d* at an angle ($\theta_{pitch}$, $\theta_{yaw}$) of the head or at the location 8*p*-7 of the coordinates (p7, R7) to which the operator 2 moves.

In the guidance display 9*a*-7 depicted in FIG. 12B, the guidance icon 9*i* moves on a track 7*q*-7 at speed depending on the distance d7 at a lower right area closer the target 7*t*-7 in the visual field 7*d*-7 from the location 8*p*-7 of the operator 2.

Since the operator 2 approaches the target 7*t*-7, the distance d7 becomes shorter than the distance d6. Accordingly, a moving speed of the guidance icon 9*i* becomes slower. Since the moving speed of the guidance icon 9*i* becomes slower, the operator 2 is able to confirm moving toward the target 7*t*-7.

In FIG. 12A and FIG. 12B, respective positions for the guidance displays 9*a*-6 and the 9*a*-7 (hereinafter, simply called "guidance display 9*a*") may be determined based on the angle difference θd.

Figure 13:
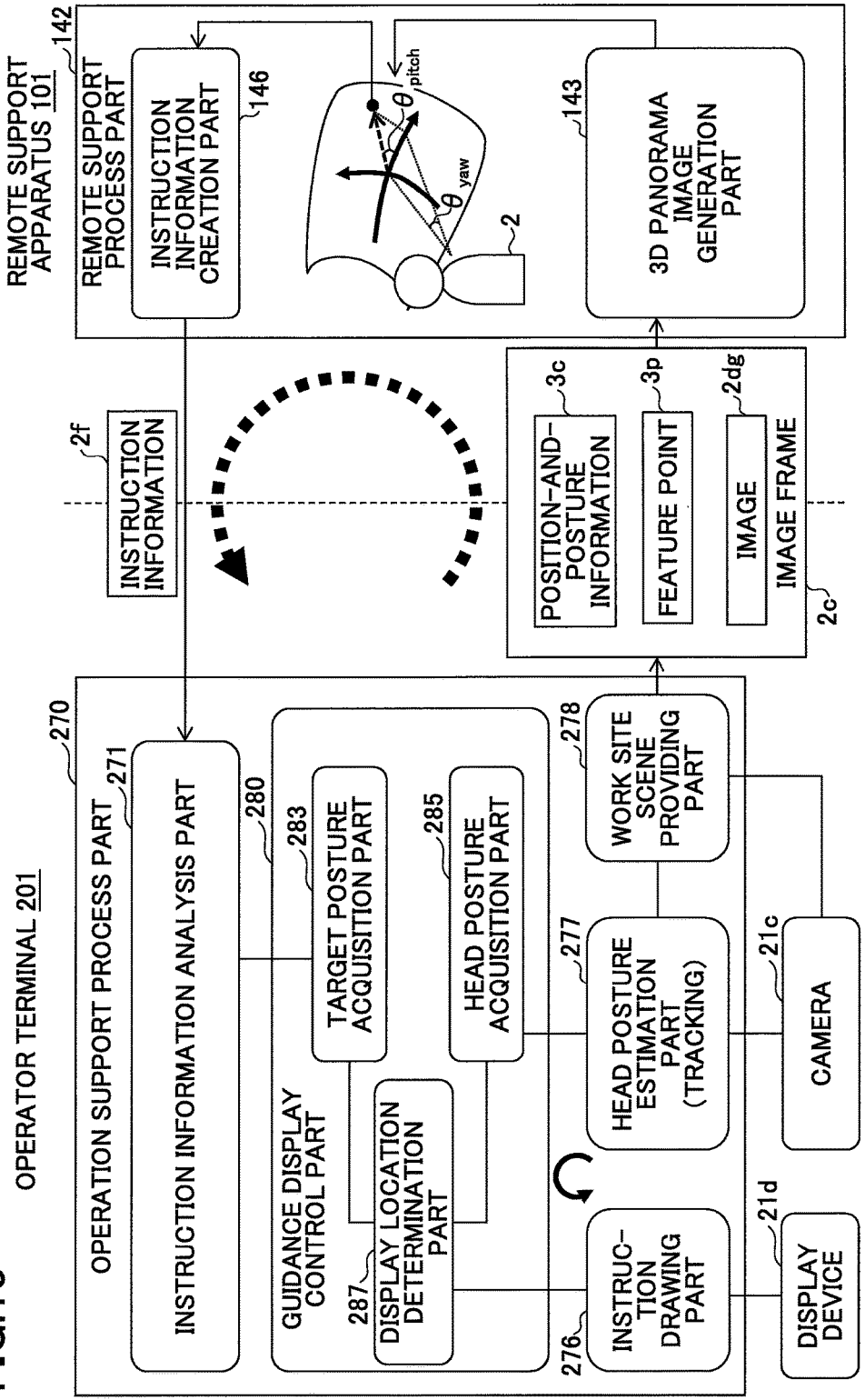
FIG. 13 is a diagram illustrating a functional configuration example of the remote operation support system.

Next, a functional configuration example of the remote operation support system 1000 in the embodiment will be described. FIG. 13 is a diagram illustrating the functional configuration example of the remote operation support system. In FIG. 13, the remote support apparatus 101 mainly includes a remote support process part 142. Also, the operator terminal 201 mainly includes an operation support process part 270.

The remote support process part 142 of the remote support apparatus 101 generates the 3D panorama image 4 representing the work environment view from the operator 2, and displays the 3D panorama image 4 at the display device 115. The remote support process part 142 creates the instruction information 2*f* depending on the instruction position 7*p* received from the input device 114, which the operator 1 manipulates, and sends the created instruction information 2*f* to the operator terminal 201 through the network communication part 117.

The remote support process part 142 includes a 3D panorama image generation part 143 and an instruction information creation part 146. The 3D panorama image generation part 143 and the instruction information creation part 146 are realized by the CPU 111 executing corresponding programs.

The 3D panorama image generation part 143 converts the 2*dg* into the 3D image 3*dg*-1 by using the frustum generation model from the image frame 2*c* which the network communication part 117 receives (FIG. 4). The 3D panorama image 4 is generated by overlapping a plurality of the 3D images 3*dg*-1 on each other based on the feature points 3*p* (FIG. 4, FIG. 5, and FIG. 6). The generated 3D panorama image 4 is displayed at the display device 115.

The instruction information creation part 146 acquires the angle difference θd of the instruction position 7*p* at which the instructor 1 indicates on the 3D panorama image 4 displayed at the display device 115. The angle difference θd is indicated by ($\theta_{pitch}$, $\theta_{yaw}$). $\theta_{pitch}$ indicates a vertical angle of the head of the operator 2, and $\theta_{yaw}$ indicates a horizontal angle of the head of the operator 2. The instruction information creation part 146 creates the instruction information 2*f* including the angle difference θd and the instruction detail 2*g* which are input by the instructor 1, and sends the instruction information 2*f* to the operator terminal 201 through the network communication part 117 (FIG. 7D and FIG. 8D).

The operation support process part 270 of the operator terminal 201 includes an instruction information analysis part 271, a guidance display control part 280, an instruction drawing part 276, a head posture estimation part 277, and a work site scene providing part 278. The instruction information analysis part 271, the guidance display control part 280, the instruction drawing part 276, the head posture estimation part 277, and the work site scene providing part 278 are realized by the CPU 211 executing corresponding programs.

The instruction information analysis part 271 analyzes the instruction information 2*f* which the network communication part 217 receives from the remote support apparatus 101. The instruction detail 2*f* and the angle difference θd, which are acquired by analyzing the instruction information 2*f* are reported to the guidance display control part 280.

Figure 12:
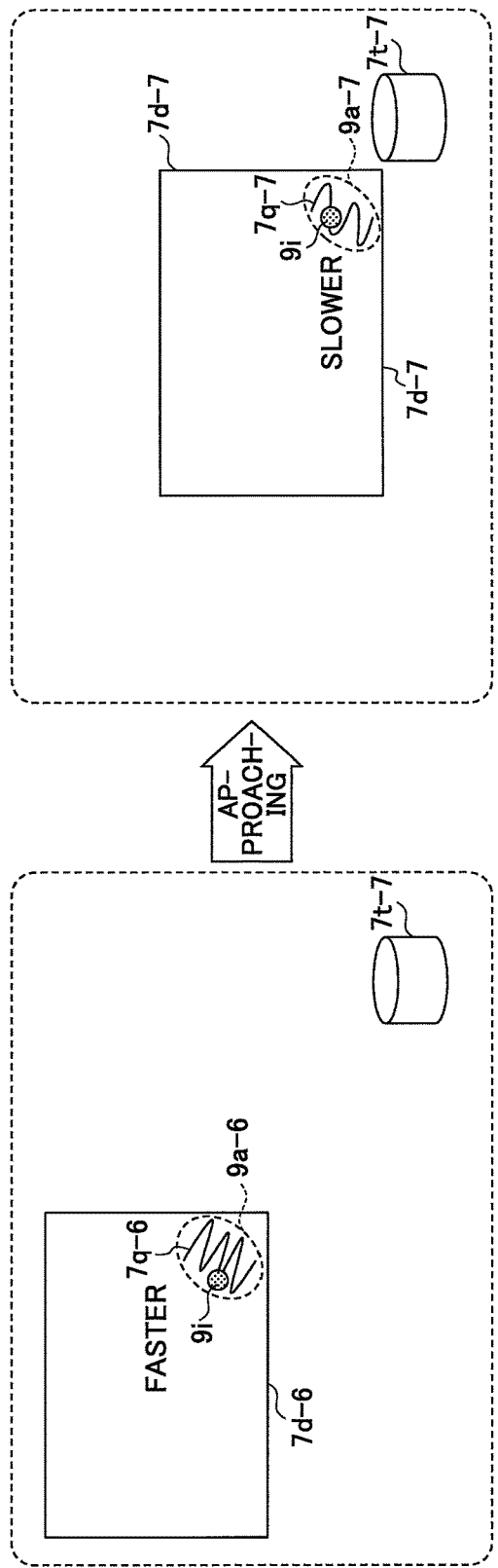
FIG. 12A and FIG. 12B are diagrams illustrating examples of a guidance display.

The guidance display control part 280 selects one of an option of displaying the instruction detail 2*g* and another option of the guidance display 9*a*-6 or 9*a*-7 (hereinafter, may be generally called "guidance display 9*a*"), depending on whether the target 7*t* is in the current visual field 7*d*, determines the display position, and conducts a guidance display control for causing the instruction drawing part 276 to display the guidance display 9*a* (FIG. 9, FIG. 11, and FIG. 12). The guidance display control part 280 includes a target posture acquisition part 283, a head posture acquisition part 285, and a display location determination part 287.

The target posture acquisition part 283 acquires the angle difference θd of the target 7*t* from information reported from the instruction information analysis part 271, and provides the acquired angle difference θd to the display location determination part 287. Also, the head posture acquisition part 285 acquires head posture information of the operator 2 from information reported from the head posture estimation part 277, and provides the acquired head posture information to the display location determination part 287. The head posture information includes location coordinates of the operator 2 in the three dimensional real environment and posture information indicated by (θ pitch, θ yaw).

The display location determination part 287 calculates position coordinates of the target 7*t* in the three dimensional real environment by using the angle difference θd and the position-and-posture information 3*c* of the target 7*t* (FIG. 9), controls the instruction drawing part 276, and causes the display device 21*d* to conduct the displaying of the instruction detail 2*g* or the guidance display 9*a*.

The display location determination part 287 determines whether the target 7*t* exists in the visual field 7*d*, based on the calculated position coordinates of the target 7*t* in the three dimensional real environment. The position coordinates of the target 7*t* are calculated by using the position-and-posture information 3*c* and the angle difference θd (FIG. 11). Also, it is determined whether the position coordinates of the target 7*t* exists inside or outside the visual field 7*d*, by using a range of the visual field 7*d* defined based on the position-and-posture information 3*c*.

In a case in which the target 7*t* exists in the visual field 7*d* (FIG. 10), the display location determination part 287 determines the display position for displaying the instruction detail 2*g* based on the position coordinates of the target 7*t* by the coordinate system of the display device 21*d*. Accordingly, the instruction detail 2*g* and the display position are reported to the instruction drawing part 276.

In a case in which the target 7*t* is outside the visual field 7*d* (FIG. 12), the display location determination part 287 determines the display position of the guidance display 9*a* based on the position coordinates of the target 7*t* by the coordinate system of the display device 21*d*. Also, the display location determination part 287 determines the moving speed of the guidance icon 9*i* of the guidance display 9*a* depending to the distance between the view point of the operator and the target 7*t*. The display position of the guidance display 9*a* and the moving speed of the guidance icon 9*i* are reported to the instruction drawing part 276.

The instruction drawing part 276 displays information pertinent to the instruction from the instructor 1 to the display device 21d based on the information received from the display location determination part 287 of the guidance display control part 280. The instruction detail 2g or the guidance display 9a is displayed at the display device 21d.

The head posture estimation part 277 includes the monocular SLAM function, and simultaneously estimates the position-and-posture information 3c of the camera 21c the feature point map 3m (FIG. 3) indicating the feature points 3p in three dimension in the image 2dg, by analyzing the image 2dg received from the camera 21c. The position-and-posture information 3c, the feature point map 3m, and the like are stored in the memory 212. The estimated feature points 3p are accumulated in the feature point map 3m each time.

By acquiring the position-and-posture information 3c from the image 2dg successively captured by the camera 21c, the head location of the operator 2 is tracked. The head posture estimation part 277 successively provides the position-and-posture information 3c to the head posture acquisition part 285. The head posture acquisition part 285 provides the position-and-posture information 3c to the display location determination part 287. The display location determination part 287 updates the display position of the instruction detail 2g or the position of the guidance display 9a depending on at least one of the location of the head and a change of the posture of the operator 2.

The work site scene providing part 278 receives the image 2dg from the camera 21c, receives the position-and-posture information 3c and the feature points 3p from the head posture estimation part 277, creates the image frame 2c, and sends the created image frame 2c with the position-and-posture information 3c and the feature points 3p to the remote support apparatus 101 through the network communication part 217.

Next, a 3c panorama image generation process conducted by the 3D panorama image generation part 143 and the instruction information creation process conducted by the instruction information creation part 146 will be described below.

Figure 14A:
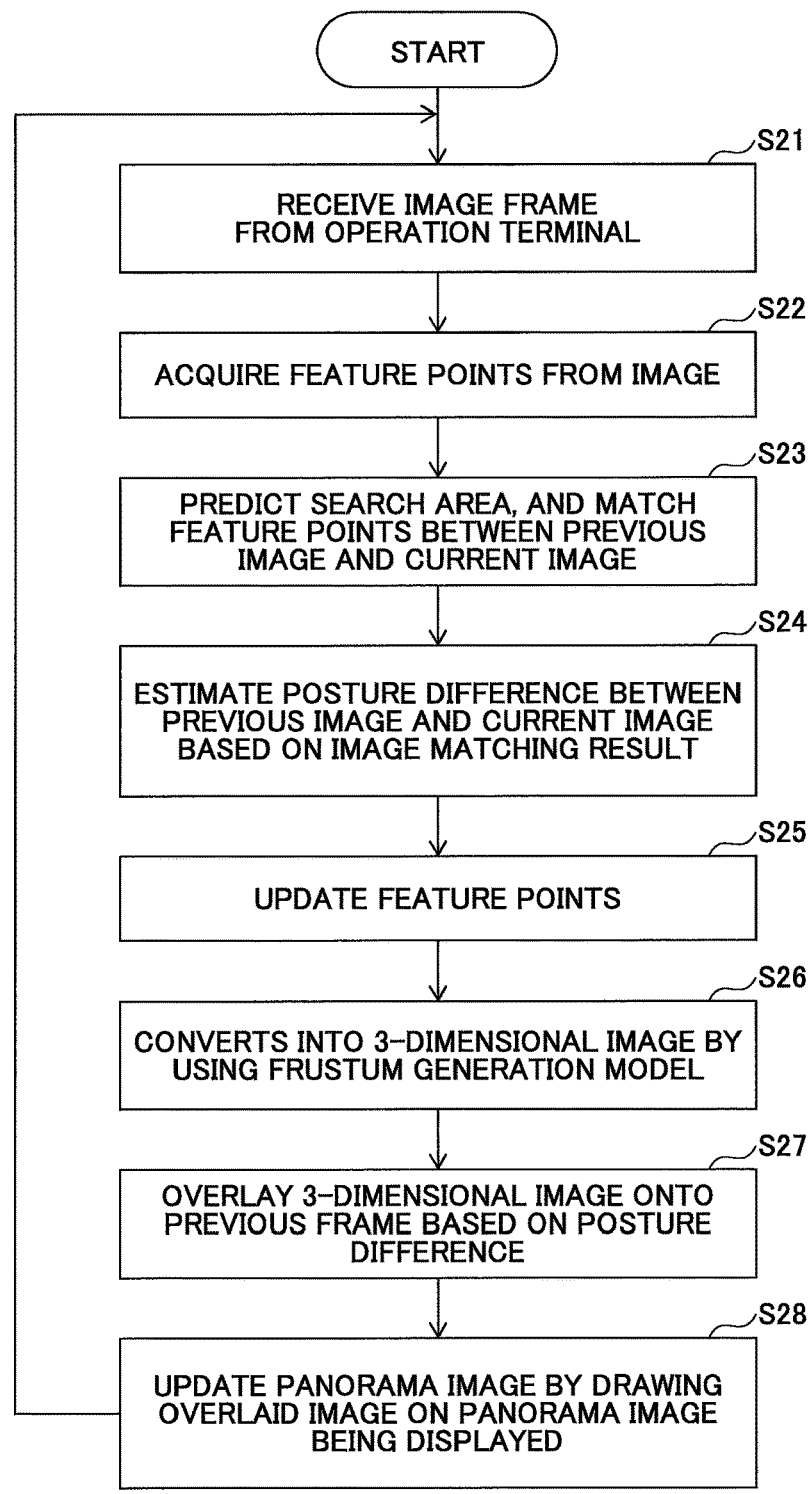
FIG. 14A and FIG. 14B are diagrams for explaining a 3D panorama image generation process.
Figure 14B:
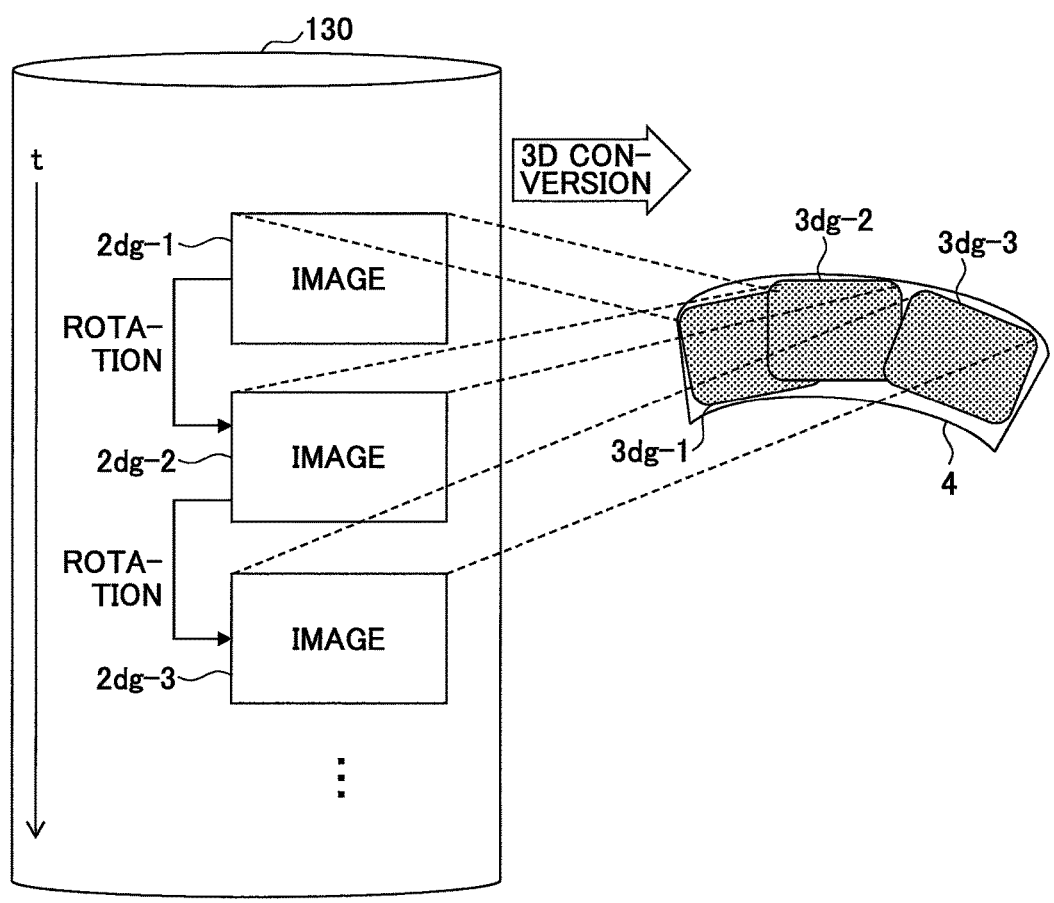

FIG. 14A and FIG. 14B are diagrams for explaining the 3D panorama image generation process. FIG. 14A illustrates a flowchart for explaining the 3D panorama image generation process, and FIG. 14B illustrates an example of an overlay of the 3D image. Referring to FIG. 14B, in FIG. 14A, the 3D panorama image generation process conducted by the 3D panorama image generation part 143 will be described. Every time a rotary motion is detected, processes in steps S11 through S15 are conducted.

When the 3D panorama image generation part 143 receives the image frame 2c from the operator terminal 201 (step S21), the 3D panorama image generation part 143 acquires the feature points 3p from the image 2dg (step S22), estimates search areas based on a previous image $2dg_{(i-1)}$ and a current image $2dg_{(i)}$, and conducts a feature matching process for matching the feature points 3p between the previous image $2dg_{(i-1)}$ and the current image $2dg_{(i)}$ (step S23). The variable i is a natural number (1, 2, 3, . . . ).

The 3D panorama image generation part 143 estimates a posture difference between the current image frame and the current image frame based on an image matching result in step S23 (step S24), and updates the feature map 2m (step S25).

The 3D panorama image generation part 143 converts the current image $2dg_{(i)}$ into a current 3D image $3dg_{(i)}$ by using the frustum generation model (the formula 2 and the formula 3) (step S26), and overlays the current 3D image $3dg_{(i)}$ onto a previous 3D image $3dg_{(i-1)}$ of the previous image $2dg_{(i-1)}$ (step S27). A part of or the entire the current 3D image $3dg_{(i)}$ is overlaid on the previous 3D image $3dg_{(i-1)}$, and the previous image $2dg_{(i-1)}$ and the current 3D image $3dg_{(i)}$ is synthesized.

Next, the 3D panorama image generation part 143 draws the 3D image 3dg being overlaid on the 3D panorama image 4, and updates the 3D panorama image 4 (step S28). The 3D panorama image generation part 143 goes back to step S21 to acquire a next image $2dg_{(i)}$ from a next image frame 2c, and repeats the above described processes.

In FIG. 14B, a case, in which the images 2dg-1, 2dg-2, 2dg-3, and the like are successively captured in accordance with the rotation of the head of the operator 2 in an order of a lapse of time t, is illustrated. The images 2dg-1, 2dg-2, 2dg-3, and the like are converted into the 3D images 3dg-1, 3dg-2, 3dg-3, and the like.

Accordingly, a part of the 3D image 3dg-1 is overwritten by the 3D image 3dg-2, and a part of the 3D image 3dg-2 is overwritten by the 3D image 3dg-3. Accordingly, the 3D panorama image 4 is generated.

When the 3D panorama image 4 is generated, the 3D images 3dg-1, 3dg-2, 3dg-3, and the like are associated with the image frames 2c for the images 2dg-1, 2dg-2, 2dg-3, and the like, and displayed at the display device 115. Accordingly, it is possible to specify the image frame 2c corresponding to the instruction position 7p, at which the instructor 1 indicates on the 3D panorama image 4 (FIG. 7B and FIG. 8B).

The instruction information creation part 146 conducts the instruction information creation process as described with reference to FIG. 7A through FIG. 7D and FIG. 8A through FIG. 8D. FIG. 15 is a diagram for explaining the instruction information creation process. In FIG. 15, when the instruction information creation part 146 receives the instruction position 7p and the instruction detail 2g from the input device 114 (step S51), the instruction information creation part 146 specifies the image frame 2c from the instruction position 7p (step S52).

Next, the instruction information creation part 146 specifies the anchor feature points 3a from the feature points 3p of the specified frame 2c by referring to the feature point map 3m, and calculates the angle difference θd (step S53) (FIG. 9).

The instruction information creation part 146 creates the instruction information 2f including the angle difference θd and the instruction detail 2g (step S54), and sends the instruction information 2f to the operator terminal 201 (step S55). After that, the instruction information creation part 146 terminates the instruction information creation process.

Figure 16:
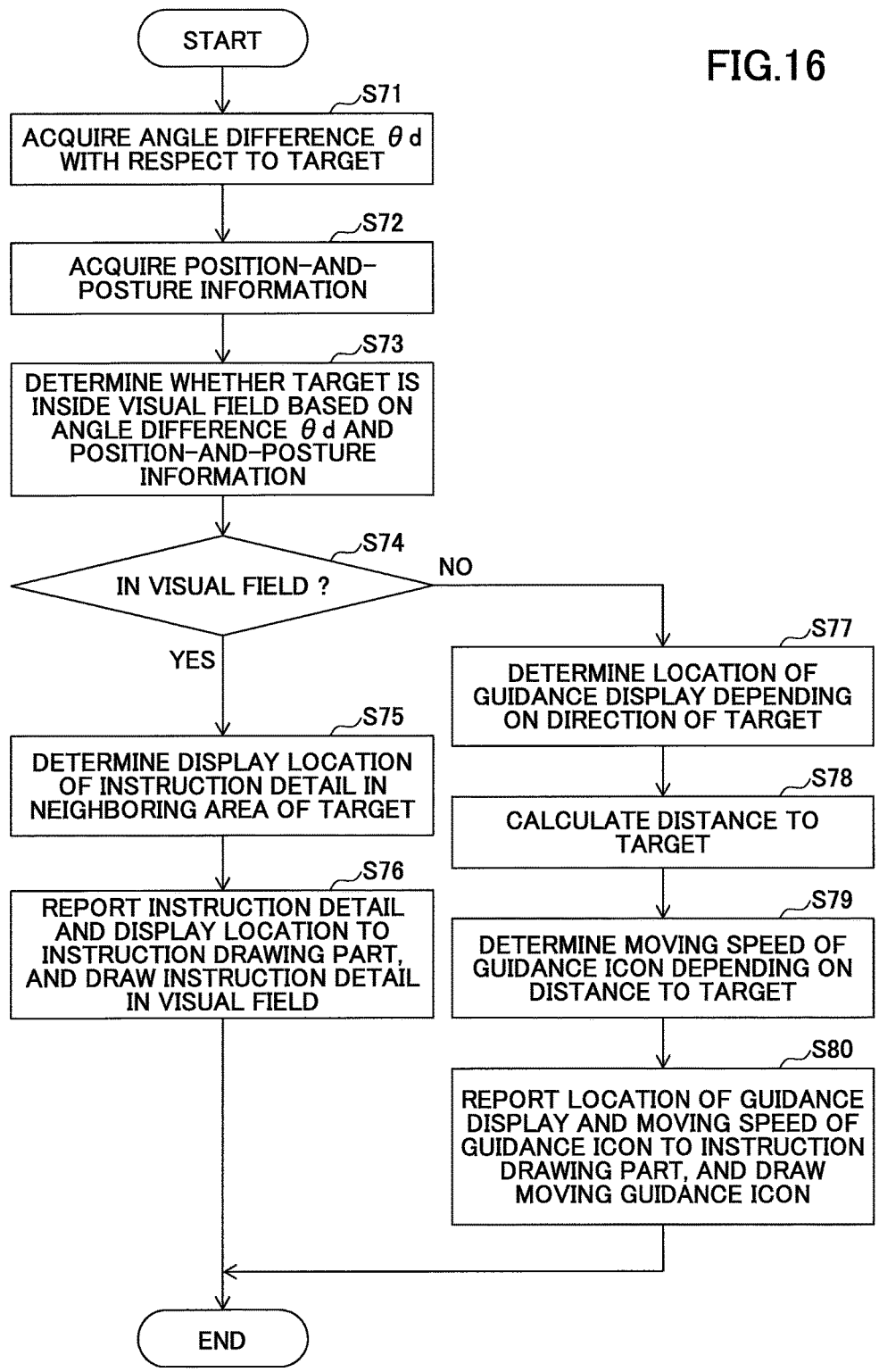
FIG. 16 is a flowchart for explaining an instruction information creation process.

Next, the instruction information creation process (FIG. 10, FIG. 11, and FIG. 12) conducted by the guidance display control part 280 of the operator terminal 201 will be described. FIG. 16 is a flowchart for explaining the instruction information creation process. In FIG. 16, in the guidance display control part 280, the target posture acquisition part 283 acquires the angle difference θd with respect to the target 7t (step S71), and the head posture acquisition part 285 acquires the position-and-posture information 3c (step S72). The display location determination part 287 determines whether the target 7t is in the visual field 7d based on the angle difference θd and the position-and-posture information 3c (step S73).

When a determination result indicates that the target 7t is in the visual field 7d (YES in step S74), the display location determination part 287 determines the display position of the instruction detail 2g in the area around the target 7t (step S75). The display location determination part 287 reports the instruction detail 2g and the display position to the instruction drawing part 276, and causes the instruction drawing part 276 to draw the indication detail 2 in the visual field 7d (step S76). After the instruction detail 2g is drawn, the guidance display control part 280 terminates the guidance display control process.

On the other hand, when the determination result indicates that the target 7t is outside the visual field 7d (NO in step S74), the display location determination part 287 determines the position of the guidance display 9a depending on the direction of the target 7t (step S77), and calculates the distance to the target 7t (step S78).

The display location determination part 287 determines the moving speed of the guidance icon 9i depending on the calculated distance to the target 7t (step S79). The display location determination part 287 reports the position of the guidance display 9a and the guidance icon 9i to the instruction drawing part 276, and displays the moving guidance icon at the display device 21d (step S80). After the guidance icon 9i is displayed, the guidance display control part 280 terminates the guidance display control process.

As described above, in the embodiment, it is possible to provide images at the work site so as to intuitively recognize the view direction of the operator 2 at real time. Also, it is possible for the instructor 2 to indicate the target 7t located outside a range of the image currently captured and displayed at the display device 21d of the operator 2.

The position of the target 7t indicated by the instructor 1 on the 3D panorama image 4 is represented by the angle difference θd with respect to a current view direction of the operator 2. Hence, it is possible to easily and appropriately determine the display position of the guidance display 9a in the visual field 7d.

In a case of using the two dimensional panorama image in which the multiple two dimensional images 2dg are overlapped each other based on the feature points 3p, it is difficult to acquire the angle difference θd in the embodiment. In the embodiment in which the angle difference θd is acquired, compared to a case of indicating the target 7p on the two dimensional panorama image, it is possible to precisely indicate the target 7t and conduct the guidance display 9a at the display device 21d of the operator 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operation support method, comprising:
   generating a three dimensional panorama image by overlapping multiple images with each other based on posture information of a camera and a feature point map of the multiple images captured by the camera, and displaying the three dimensional panorama image including a latest image at a first display device; and
   outputting, at a second display device, position information representing an angle difference indicating a rotation amount of the camera to move toward a target indicated based on current posture information of the camera in response to an indication by pointing to the target on the three dimensional panorama image including the latest image.

2. The operation support method according to claim 1, further comprising:
   calculating an aspect ratio from a focal length of the camera;
   calculating a field angle based on the focal length and an optical center of the camera;
   generating a frustum of the camera by using the calculated aspect ratio and the field angle;
   converting an image into a three dimensional image by conducting a texture mapping of the image based on the generated frustum; and
   generating the three dimensional panorama image by arranging the three dimensional image in accordance with a direction indicated by the posture information and by overlapping a plurality of the three dimensional images based on the feature point map,
   wherein the posture information indicates a vertical angle and a horizontal angle.

3. The operation support method according to claim 2, further comprising:
   specifying a closest feature point to a position indicated on the three dimensional panorama image by referring to the feature point map;
   acquiring an angle difference between a first vector from the camera to the closest feature point and a second vector from the camera to a center of the image; and
   conducting, at the second display device, position information of the target based on the acquired angle difference.

4. The operation support method according to claim 3, further comprising:
   displaying, at the second display device, information indicating a direction and a distance to the target based on the position information of the target, when the target is outside a range of the image.

5. A non-transitory computer-readable recording medium that stores an operation support program that causes a computer to execute a process comprising:
   generating a three dimensional panorama image by overlapping multiple images with each other based on posture information of a camera and a feature point map of the multiple images captured by the camera, and displaying the three dimensional panorama image including a latest image at a first display device; and
   outputting, at a second display device, position information representing an angle difference indicating a rotation amount of the camera to move toward a target indicated based on current posture information of the camera in response to an indication by pointing to the target on the three dimensional panorama image including the latest image.

6. An operation support system, comprising:
   a first display device configured to generate a three dimensional panorama image by overlapping multiple images with each other based on posture information of a camera and a feature point map of the multiple images captured by the camera, and display the three dimensional panorama image including a latest image; and
   a second display device configured to output position information representing an angle difference indicating a rotation amount of the camera to move toward a target indicated based on current posture information of the camera in response to an indication by pointing to the target on the three dimensional panorama image including the latest image.

7. An operation support apparatus, comprising:
a memory; and
a processor coupled to the memory and the processor configured to
receive a frame including an image captured by a camera through a communication device;
generate a three dimensional panorama image by overlapping multiple images with each other based on posture information of the camera and a feature point map of the multiple images captured by the camera, the overlapping multiple images and the feature point map being included in the frame received through the communication device, and display the three dimensional panorama image including a latest image at a first display device; and
output, at a second display device, position information representing an angle difference indicating a rotation amount of the camera to move toward a target indicated based on current posture information of the camera in response to an indication by pointing to the target on the three dimensional panorama image including the latest image.

8. An operator terminal, comprising:
a memory; and
a processor coupled to the memory and the processor configured to
acquire posture information obtained by estimating a posture of a camera from an image captured by the camera and a feature point map of the image;
transmit an image frame including the image, the posture information, and the feature point map to a remote apparatus;
receive, from the remote apparatus, an angle difference indicating a rotation amount of the camera for viewing a target indicated on one of transmitted images;
calculate a position of the target based on the angle difference, the acquired posture information, and the feature point map; and
display guidance information for guiding to the calculated position.

* * * * *